(12) United States Patent
Kim et al.

(10) Patent No.: US 8,850,560 B2
(45) Date of Patent: Sep. 30, 2014

(54) MOBILE DEVICE AND CONTROL METHOD THEREOF

(75) Inventors: Yoonhee Kim, Gyeonggi-Do (KR); Silhee Sung, Busan (KR); Juha Hyun, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 13/279,125

(22) Filed: Oct. 21, 2011

(65) Prior Publication Data

US 2012/0284789 A1     Nov. 8, 2012

(30) Foreign Application Priority Data

May 6, 2011 (KR) ........................ 10-2011-0043165

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| G06F 3/0488 | (2013.01) |
| G06F 1/16 | (2006.01) |
| H04M 1/67 | (2006.01) |

(52) U.S. Cl.
CPC ............ *G06F 3/0488* (2013.01); *G06F 1/1694* (2013.01); *G06F 3/04883* (2013.01); *H04M 1/67* (2013.01)
USPC .......................................................... 726/19

(58) Field of Classification Search
USPC .......................................................... 726/19
See application file for complete search history.

(56) References Cited

U.S. PATENT DOCUMENTS

| | | | |
|---|---|---|---|
| 2010/0001980 A1* | 1/2010 | Kim et al. ...................... | 345/184 |
| 2011/0080359 A1* | 4/2011 | Jang et al. ...................... | 345/173 |
| 2011/0163972 A1 | 7/2011 | Anzures et al. | |
| 2012/0081287 A1* | 4/2012 | Kim et al. ...................... | 345/168 |
| 2012/0096397 A1* | 4/2012 | Ording et al. ................. | 715/802 |
| 2012/0319985 A1 | 12/2012 | Moore et al. | |

OTHER PUBLICATIONS

IOS 5 of Apple published on Jun. 7, 2011.
Snell, "Up close with iOS 5: Photos and Camera changes," dated Oct. 13, 2011, 7 pages.
Kelly, "First Look: iOS 5 Camera and Photos features," dated Jun. 14, 2011, 5 pages.
DeRuvo, "30 of the Best iOS 5 Features (list)," dated Oct. 4, 2011, 20 pages.

* cited by examiner

*Primary Examiner* — Kambiz Zand
*Assistant Examiner* — Stephen Sanders
(74) *Attorney, Agent, or Firm* — Lee, Hong, Degerman, Kang & Waimey

(57) ABSTRACT

This specification relates to a mobile terminal capable of executing a lock state of restricting a touch input and a control method thereof. The control method for the mobile terminal, which displays a lock screen in the lock state of restricting an input of a control command for an application, includes displaying an execution screen of an application on the lock screen, and controlling the lock screen based upon a touch input detected in the lock state.

38 Claims, 25 Drawing Sheets

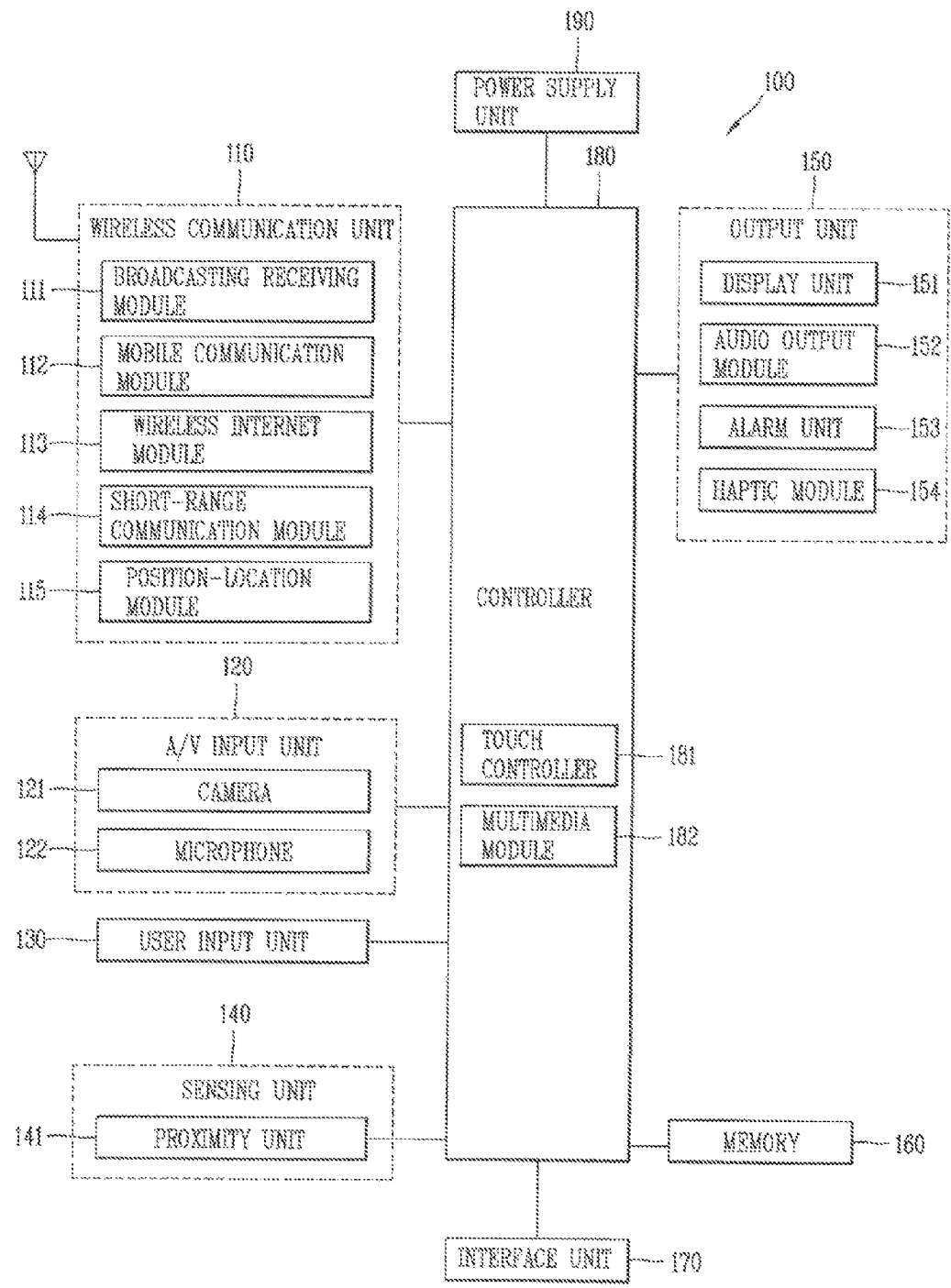

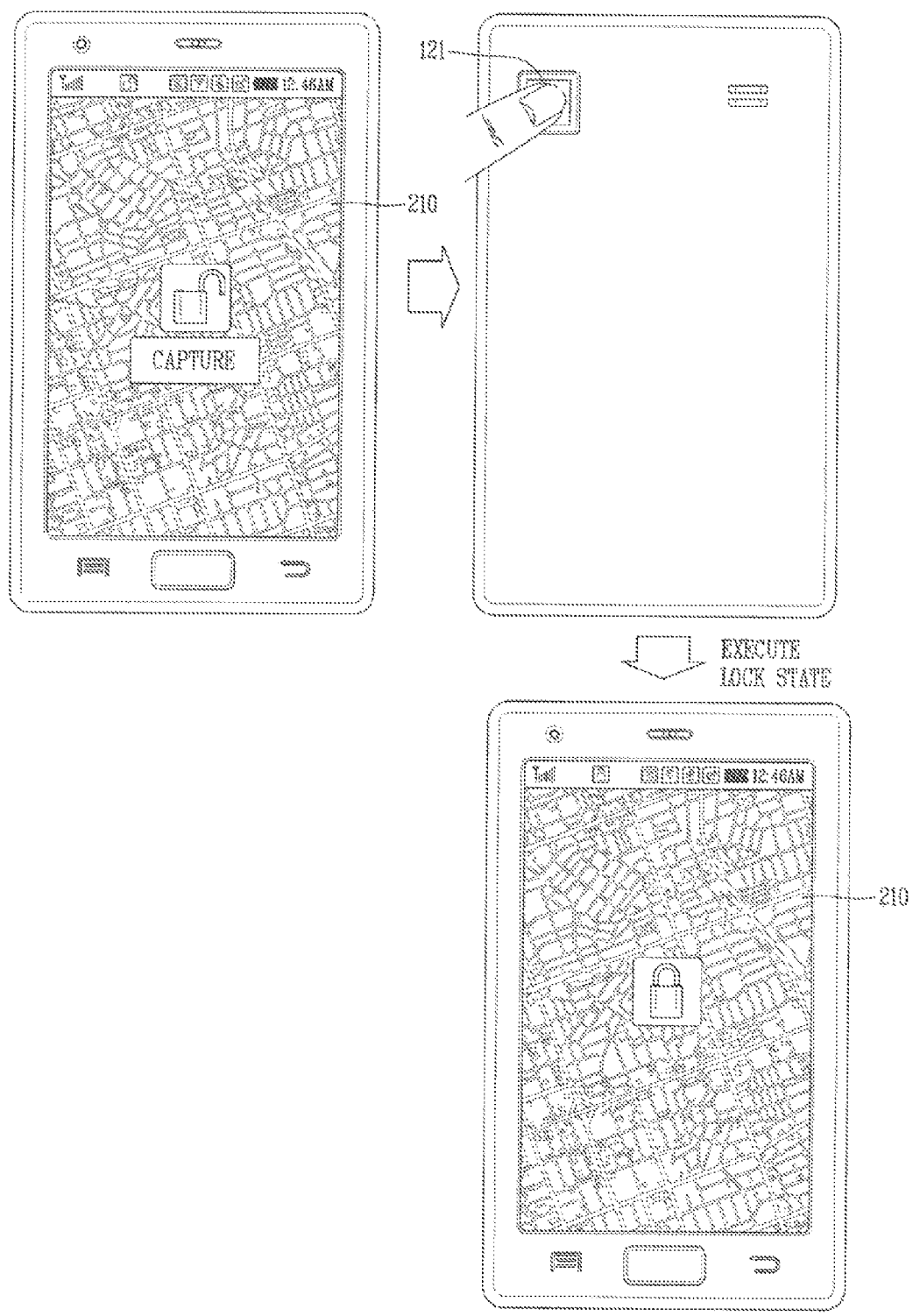

MOBILE DEVICE AND CONTROL METHOD THEREOF

CROSS-REFERENCE TO RELATED APPLICATION

Pursuant to 35 U.S.C. §119(a), this application claims the benefit of earlier filing date and right of priority to Korean Patent Application No. 10-2011-0043165, filed on May 6, 2011, the contents of which are hereby incorporated by reference herein in its entirety.

BACKGROUND OF THE INVENTION

1. Field of the Invention

This specification relates to a mobile device capable of supporting a touch input and a control method thereof.

2. Background of the Invention

Mobile device (mobile terminal, portable device, portable terminal) can be easily carried and have one or more of functions such as supporting voice and video telephony calls, inputting and/or outputting information, storing data and the like.

As it becomes multifunctional, the mobile terminal can be allowed to capture still images or moving images, play music or video files, play games, receive broadcast and the like, so as to be implemented as an integrated multimedia player.

Various new attempts have been made for the multimedia devices by hardware or software in order to implement such complicated functions.

Furthermore, many efforts are undergoing to support or enhance various functions of such mobile terminals. Such many efforts include not only changes and improvement of structural components implementing a mobile terminal but also software or hardware improvement.

When a user inputs a control command through a touch screen, the mobile terminal executes a lock mode (state) for restricting the user from inputting a control command in order to prevent an unexpected touch input. Also, in the lock mode, a lock screen including information such as date, time and the like is displayed.

SUMMARY OF THE INVENTION

Therefore, an aspect of the detailed description is to provide information related to an application on a lock screen of a mobile device (mobile terminal, portable terminal).

Another aspect of the detailed description is to provide a mobile terminal capable of easily accessing an application when a lock state is released.

To achieve these and other advantages and in accordance with the purpose of this specification, as embodied and broadly described herein, a method for controlling a mobile terminal, which displays a lock screen in a lock state of restricting an input of a control command for an application, may include displaying an execution screen of an application on the lock screen, and controlling the lock screen based upon a touch input detected in the lock state.

The controlling of the lock screen may be configured to convert the displayed execution screen into an execution screen of another application based upon the touch input.

The lock screen may display one of execution screens of a plurality of applications which are being run in the lock state, and when the touch input is detected, the displayed execution screen may be disappeared and another execution screen of the execution screens of the plurality of applications may be displayed, the another execution screen being different from the displayed execution screen.

The controlling of the lock screen may be configured to convert the displayed execution screen into an execution screen of another application or to activate an application corresponding to the displayed execution screen and release the lock state, based upon different touch inputs.

When a first touch input is detected on the lock screen, the displayed execution screen may be converted into the execution screen of the another application, and when a second touch input consecutive to the first touch input is detected on the lock screen, the application corresponding to the execution screen may be activated and the lock state may be released.

The execution screen may be updated in the lock state according to an execution of the application.

The lock screen may be kept powered on for a preset time, and the power-on time of the lock screen may be set by inclination of the mobile terminal or by a key input.

The displaying of the execution screen of the application may be configured to display execution screens corresponding to a plurality of applications.

When a touch input is detected on one of the execution screens, an application corresponding to the one execution screen may be activated and the lock state may be released.

The activated application may be an application corresponding to an execution screen displayed at a portion where the touch input is released.

When a first touch input is detected on one of the execution screens, an object as a target of a second touch input may be displayed, and when the second touch input is detected on the object, an application corresponding to the one execution screen may be activated and the lock state may be released.

When the application is an image capturing application, an image signal input via a camera may be displayed on the execution screen.

The lock screen may display a control window for controlling capturing of the image signal.

When the application is a video reproducing application and the lock state is executed, the video reproducing may be paused, and when the lock state is released, the video may be reproduced again.

The displayed execution screen in the lock state may be at least one of an execution screen of an application last displayed before the lock state is executed, an execution screen of an application having received a capture command before the lock state is executed, an execution screen of an application being executed in the lock state, or an execution screen of an application having a newly generated event in the lock state.

The displaying of the execution screen may be configured to preferentially display an execution screen of an application, from which the event has been generated during the lock state, over the other execution screens.

The method may further include executing the lock state in a state that the execution screen of the application has been captured, and the execution screen displayed on the lock screen may be the captured execution screen of the application.

In accordance with one exemplary embodiment, a mobile terminal for displaying a lock screen in a lock state of restricting an input of a control command for an application may include a display unit configured to display an execution screen of the application on the lock screen, a touch controller configured to detect a touch input applied onto the display unit in the lock state, and a controller configured to control the lock screen based upon the detected touch input.

The controller may be configured to convert the displayed execution screen into an execution screen of another application based upon the detected touch input.

The controller may be configured to convert the displayed execution screen into an execution screen of another application or activate an application corresponding to the displayed execution screen and release the lock state, based upon different touch inputs.

The display unit may display execution screens corresponding to a plurality of applications, and when the touch controller detects a first touch input on one of the execution screens, the display unit may display an object as a target of a second touch input.

When the second touch input is detected on the object, the controller may activate an application corresponding to the one execution screen and release the lock state.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram of a mobile terminal in accordance with one exemplary embodiment;

FIG. 16 is an overview showing a method for displaying a captured screen as a lock screen in the mobile terminal.

DETAILED DESCRIPTION OF THE INVENTION

Figure 2A:
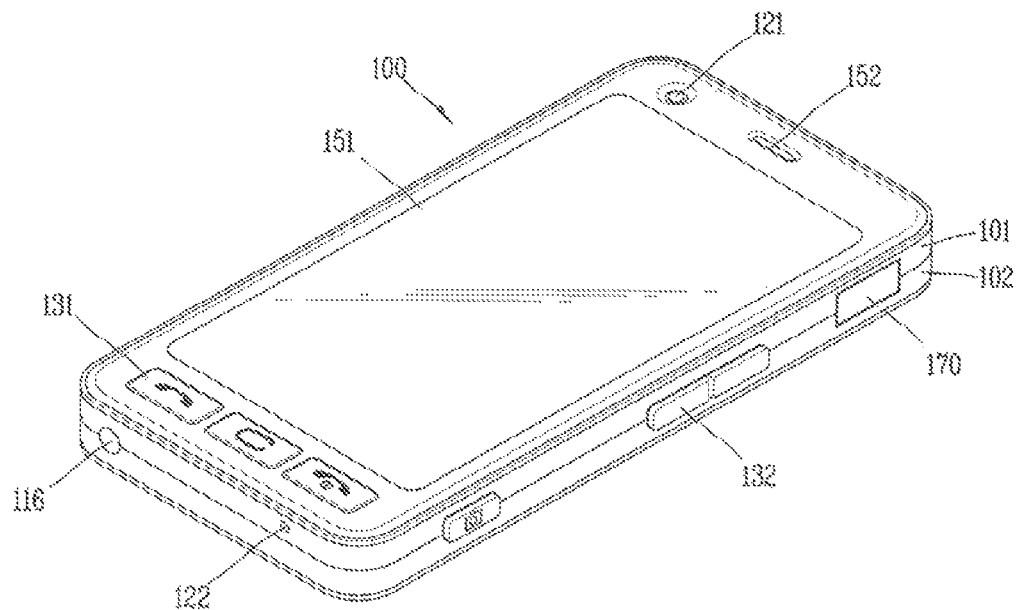
FIG. 2A is a front perspective view of the mobile terminal.

Description will now be given in detail of the exemplary embodiments, with reference to the accompanying drawings.

For the sake of brief description with reference to the drawings, the same or equivalent components will be provided with the same reference numbers, and description thereof will not be repeated. Hereinafter, suffixes "module" and "unit or portion" for components used herein in description are merely provided only for facilitation of preparing this specification, and thus they are not granted a specific meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described in this specification may include cellular phones, smart phones, laptop computers, digital broadcasting terminals, personal digital assistants (PDAs), portable multimedia players (PMPs), E-books, navigators, and the like. However, it may be easily understood by those skilled in the art that the configuration according to the exemplary embodiments of this specification can be applied to stationary terminals such as digital TV, desktop computers and the like excluding a case of being applicable only to the mobile terminals.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100.

Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

Also, the controller 180 may execute a lock state, in which a user is restricted from inputting a control command for applications, when a state of the mobile terminal satisfies a preset condition. The controller 180 may control a lock screen, which is displayed in the lock state, based upon a touch input detected on the display unit 151 (hereinafter, referred to 'touch screen') in the lock state.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

Hereinafter, description will be given of the structure of the mobile terminal in accordance with the one exemplary embodiment or a portable terminal or mobile terminal having components disposed.

Figure 2B:
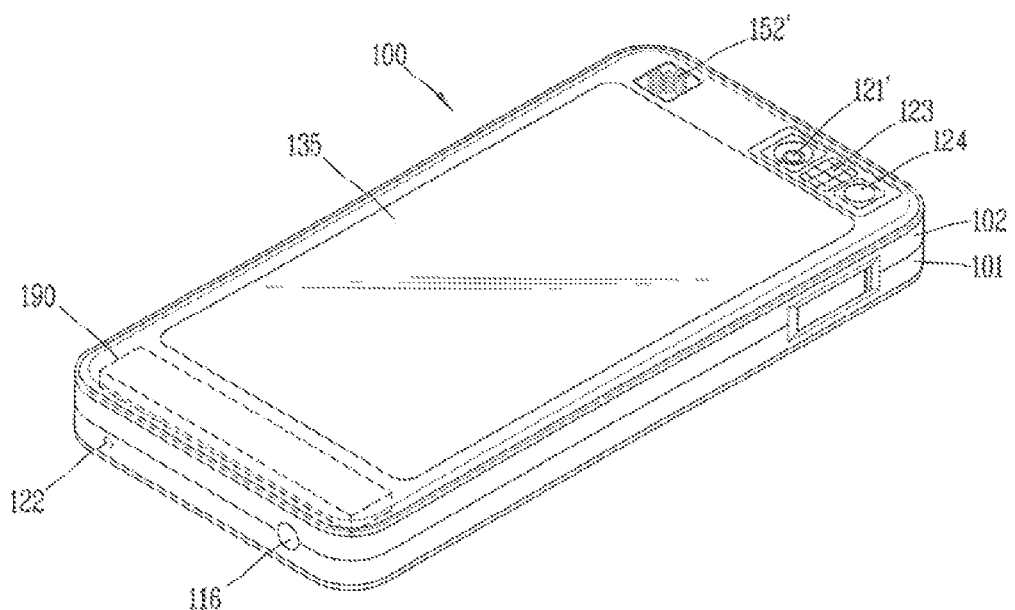
FIG. 2B is a rear perspective view of the mobile terminal.

FIG. 2A is a front perspective view of the portable or mobile terminal, and FIG. 2B is a rear perspective view of the mobile terminal of FIG. 2A.

A mobile terminal 100 disclosed herein has a bar type terminal body. Here, the present disclosure may not be limited to the type, but be applicable to various types such as a slide type, a folder type, a swing type, a swivel type and the like, having two or more bodies coupled to be relatively movable with each other.

The terminal body 100 (hereinafter, referred to as 'body') includes a front surface, side surfaces and a rear surface. Also, the body includes both ends formed in a lengthwise direction.

The body may include a case (casing, housing, cover, etc.) defining an outer appearance. In this exemplary embodiment, the case may be divided into a front surface (hereinafter, referred to as 'front case') 101 and a rear surface (referred to as 'rear case') 102. Various electronic components may be mounted in a space between the front case 101 and the rear case 102. At least one intermediate case may further be interposed between the front case 101 and the rear case 102.

Such cases may be injected using a synthetic resin or be formed of a metal, such as stainless steel (STS), titanium (Ti) or the like.

The terminal body is shown having a display unit 151, an audio output module 152, a camera 121, a user input unit 130/131, 132, a microphone 122, an interface unit 170, and the like.

The display unit 151 may occupy most of a main surface of the front case 101. The audio output module 152 and the camera 121 may be disposed near one of both end portions of the display unit 151, and the user input unit 131 and the microphone 122 on the other end portion of the display unit 151. The user input unit 132, the interface unit 170 and the like may be disposed on side surfaces of the front and rear cases 101 and 102. The microphone 122 may be disposed at the other end of the body 100.

The user input unit 130 may be manipulated to allow inputting of commands for controlling operations of the mobile terminal 100, and include a plurality of first manipulation units 131, 132. The plurality of manipulation units 131, 132 may be referred to as a manipulating portion. Such manipulating portion can employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display unit 151 into a touch recognition mode, or the like.

Referring to FIG. 2B, a rear face of the terminal body, namely, the rear case 102 may further be provided with a camera 121'. The camera 121' faces a direction which is opposite to a direction faced by the camera 121, and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear face of the terminal body. The audio output module 152' can cooperate with the audio output module 152 (see FIG. 2A) to provide stereo output. Also, the audio output module 152' may be configured to operate as a speakerphone.

A broadcast signal receiving antenna 116 may further be disposed at one side of the terminal body in addition to an antenna for communications, for example. The antenna 116 configuring a part of the broadcast receiving module 111 (see FIG. 1) may be retractable into the terminal body.

A power supply unit 190 for supplying power to the mobile terminal 100 may be mounted in the terminal body. The power supply unit 190 may be mounted in the terminal body or detachably coupled directly onto the outside of the terminal body.

The rear case 102 may be further provided with a touchpad 134 for detecting a touch input. Similar to the display unit 151, the touchpad 135 may be implemented as a light-transmissive type. Here, if the display unit 151 is configured to output visual information from both surfaces, the visual information can be recognized through the touchpad 135. The information output from the both surfaces may all be controlled by the touchpad 135. Unlike to this, a display may further be mounted on the touchpad 135 so as to configure a touch screen even on the rear case 102.

The touchpad 135 may operate cooperative with the display unit 151 of the front case 101. The touchpad 135 may be disposed at a rear side of the display unit 151 in parallel to the display unit 151. The touchpad 135 may have a size the same as or smaller than that of the display unit 151.

This specification proposes displaying of an execution screen of an application on a lock screen, which is displayed in a lock state of a mobile terminal (mobile device, portable terminal), and controlling of the lock screen based upon a touch input detected in the lock state.

Hereinafter, description will be given of a method for controlling a lock screen displayed in a lock state of a mobile terminal with reference to FIGS. 1, 2A and 2B described above and FIG. 3.

Figure 3:
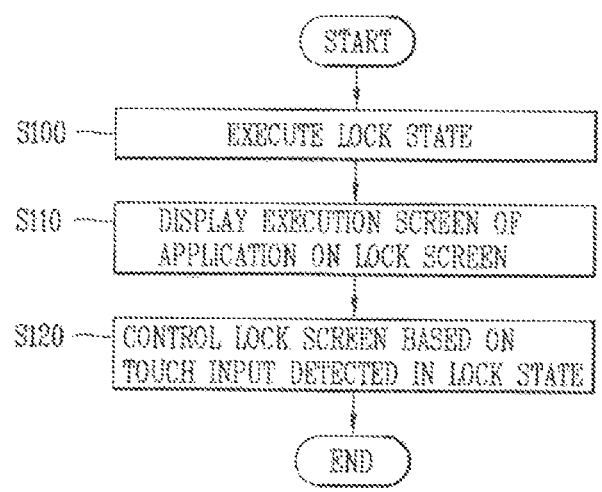
FIG. 3 is a flowchart showing a control method for the mobile terminal.

FIG. 3 is a flowchart showing a control method for a mobile terminal in accordance with one exemplary embodiment.

First, a control method for a mobile terminal in accordance with one exemplary embodiment may include executing (initiating, starting, running) a lock state when the mobile terminal meets a preset condition in an unlock state (S100), displaying an execution screen of an application on a lock screen displayed in the lock state (S110), and controlling the lock screen based upon a touch input detected in the lock state (S120).

The mobile terminal in accordance with the one exemplary embodiment may be in 'lock state' and 'unlock state' according to whether or not a user is allowed to input a control command for the mobile terminal.

First, the lock state indicates a state of restricting a user from inputting control commands for applications present in the mobile terminal. This is generally intended for preventing activation or deactivation of functions and applications of a mobile terminal having a touch screen 151 due to an input of control commands, which are unexpected by a user. Therefore, in the lock state, the user may be restricted from inputting a control command through the touch screen 151 and the user input unit 130 within a preset range.

Meanwhile, the inputting of the control command may be restricted in the lock state but functions of the mobile terminal and operations of applications, which were being run before the lock state is executed, may be continuously maintained.

The unlock state indicates a state of allowing a user to input control commands for the mobile terminal. Therefore, in this unlock state, functions and applications of the mobile terminal may be activated or deactivated according to control commands input by the user.

Herein, the lock state may be executed (started) when a user input with respect to the touch screen 151 and other user input unit 130 disposed on the mobile terminal is not detected for a preset time. The preset time may change according to a user's setting.

In this specification, as aforesaid, a case of executing a lock state due to no detection of a user input with respect to the mobile terminal for a preset time or detection of an input with respect to a specific key may be explained as 'executing a lock state when a preset condition is satisfied.'

In addition, the unlock state may be executed by a user input applied onto the specific key in the lock state or a touch input detected on a lock screen, which is displayed in the lock state.

Herein, an application corresponding to an execution screen displayed as the lock screen may be an application, which has been last displayed prior to executing the lock state, or an application corresponding to a screen captured by a user's capture command prior to executing the lock state. Also, an application corresponding to an execution screen displayed as the lock screen may be an application which is being run in the lock state, or an application from which a new event has been generated in the lock state. An application corresponding to an execution screen displayed as the lock screen may be an application which has been executed prior to the lock state executed.

Hereinafter, description will be given of several exemplary embodiments for the control method.

FIGS. 4A to 4D shows a lock screen displayed in the lock state of the mobile terminal.

Figure 4A:
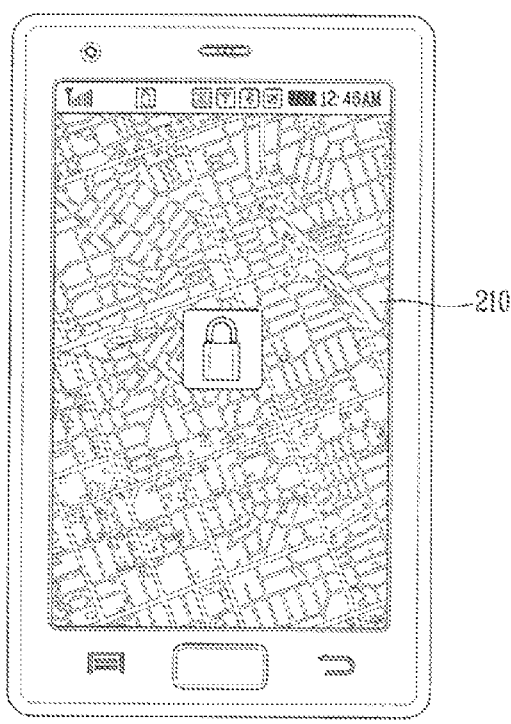
FIGS. 4A to 4D are overviews of a lock screen displayed in a lock state of the mobile terminal.

First, referring to FIG. 4A, an execution screen 210 of an application may be displayed on a lock screen, which is displayed in the lock state of the mobile terminal. For example, when a screen, which was last displayed prior to executing the lock state of the mobile terminal, is an application related to navigation, 'map' as an execution screen of the application may be displayed on the lock screen.

Figure 4B:
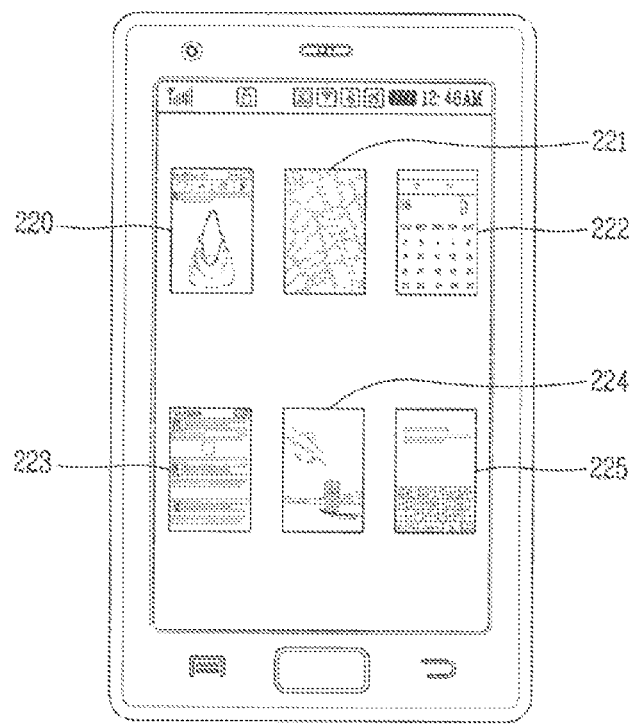
Figure 4C:
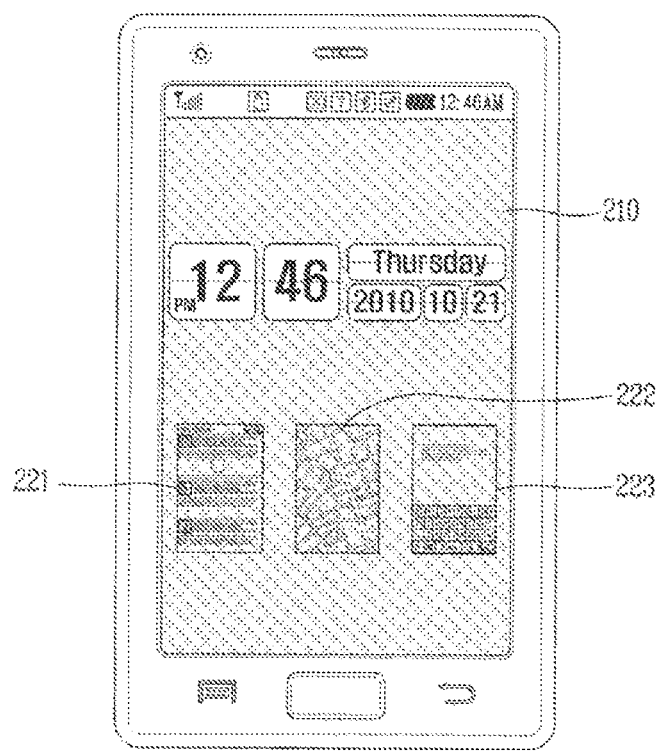

Referring to FIGS. 4B and 4C, execution screens 220 to 225 corresponding to a plurality of applications may be displayed on the lock screen of the mobile terminal.

The execution screens displayed in the lock state, as shown in FIG. 4C, may be displayed with overlapping a lock screen 210, which is set as a default in the mobile terminal.

Figure 4D:
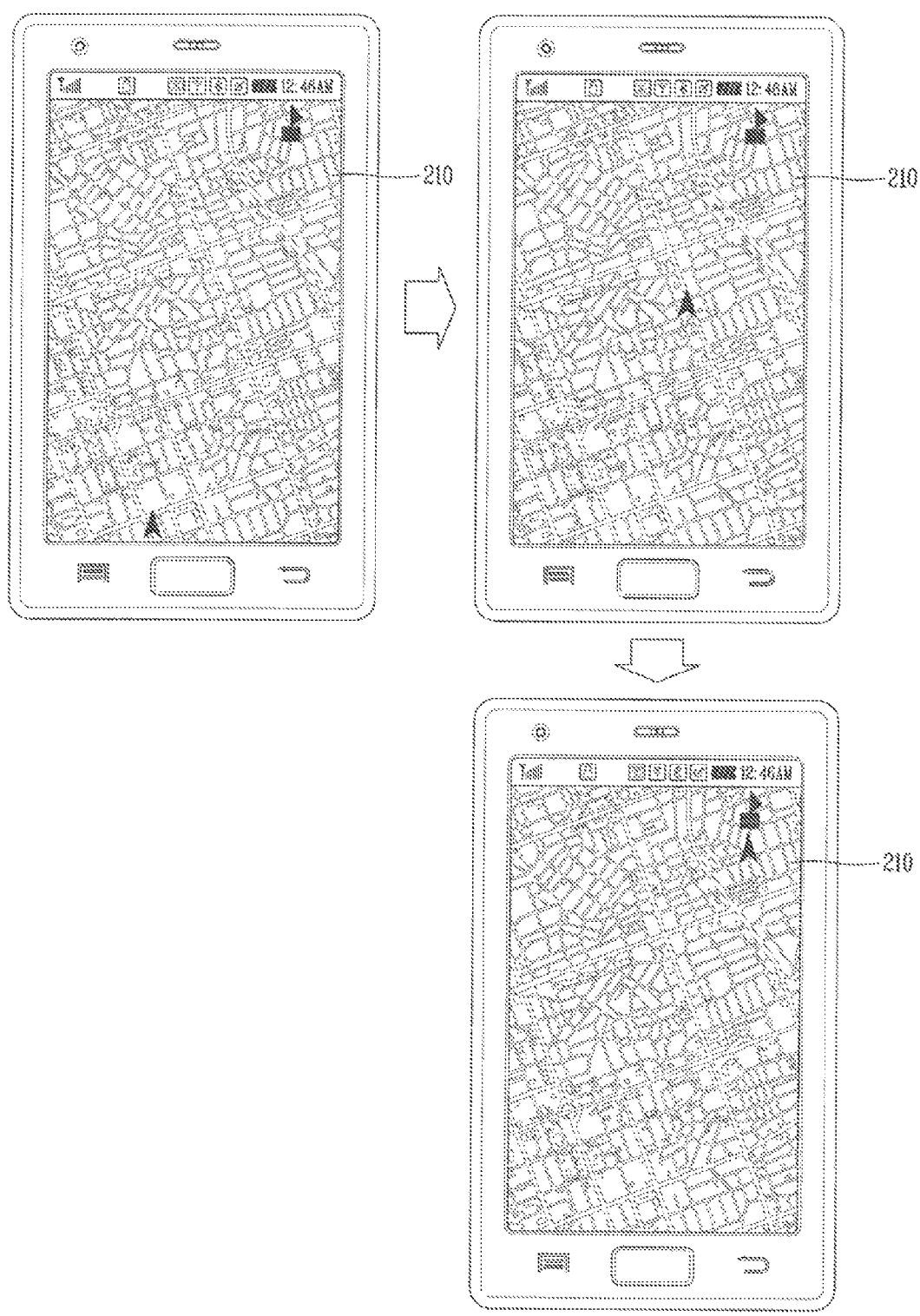

The controller 180 (see FIG. 1) of the mobile terminal, as shown in FIG. 4D, may update the execution screen 210 of the application displayed on the lock screen as the application is run.

For example, it is assumed that the application is a navigation application. Referring to FIG. 4D, the controller 180 updates an execution screen (for example, a map corresponding to the current location) displayed on the lock screen, in response to movement of the terminal. The controller 180 then displays on the lock screen the updated execution screen, namely, a screen showing a state that the terminal is moving.

Figure 5A:
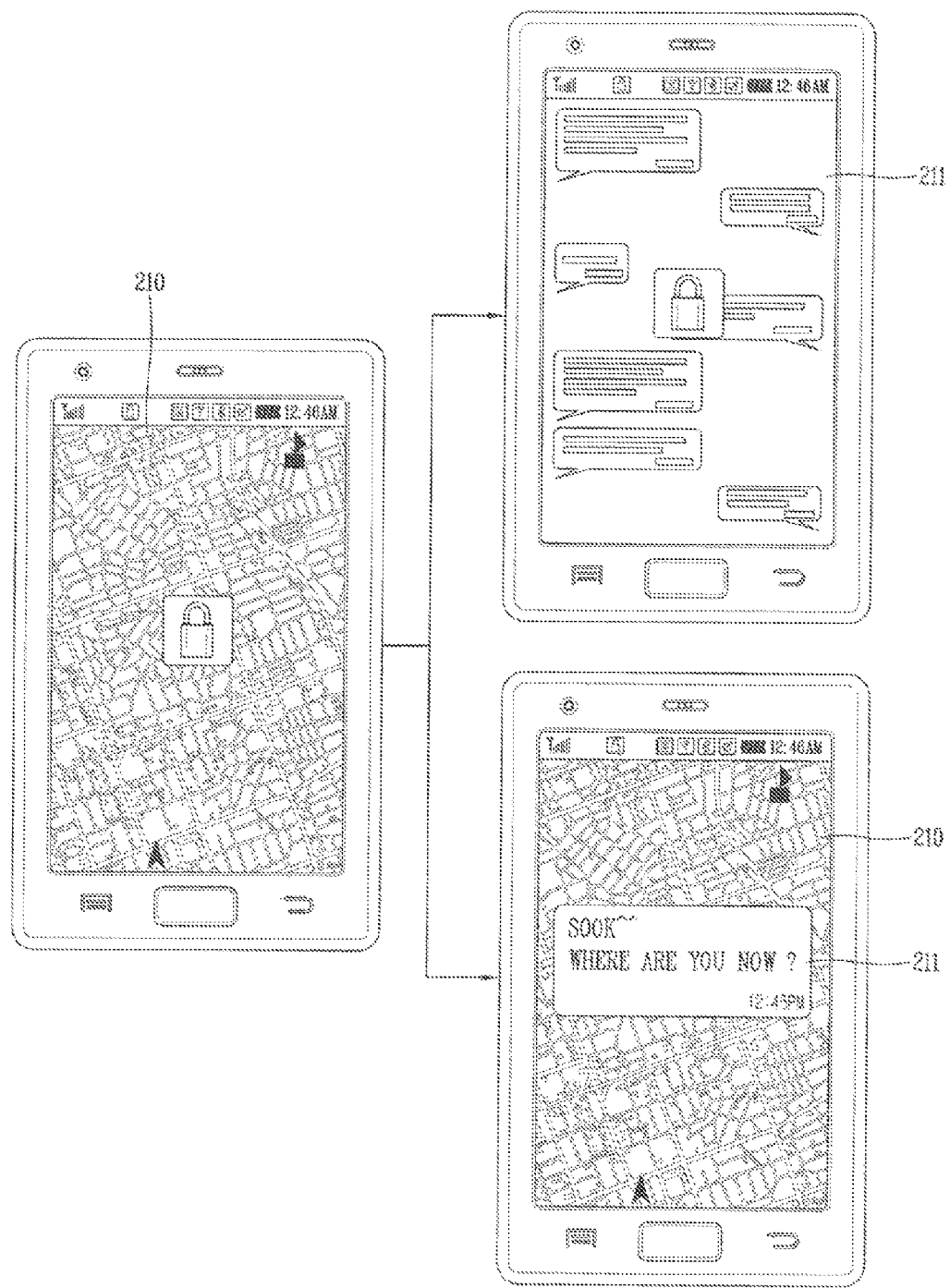
FIGS. 5A and 5B are overviews of the lock screen displayed in the lock state of the mobile terminal.
Figure 5B:
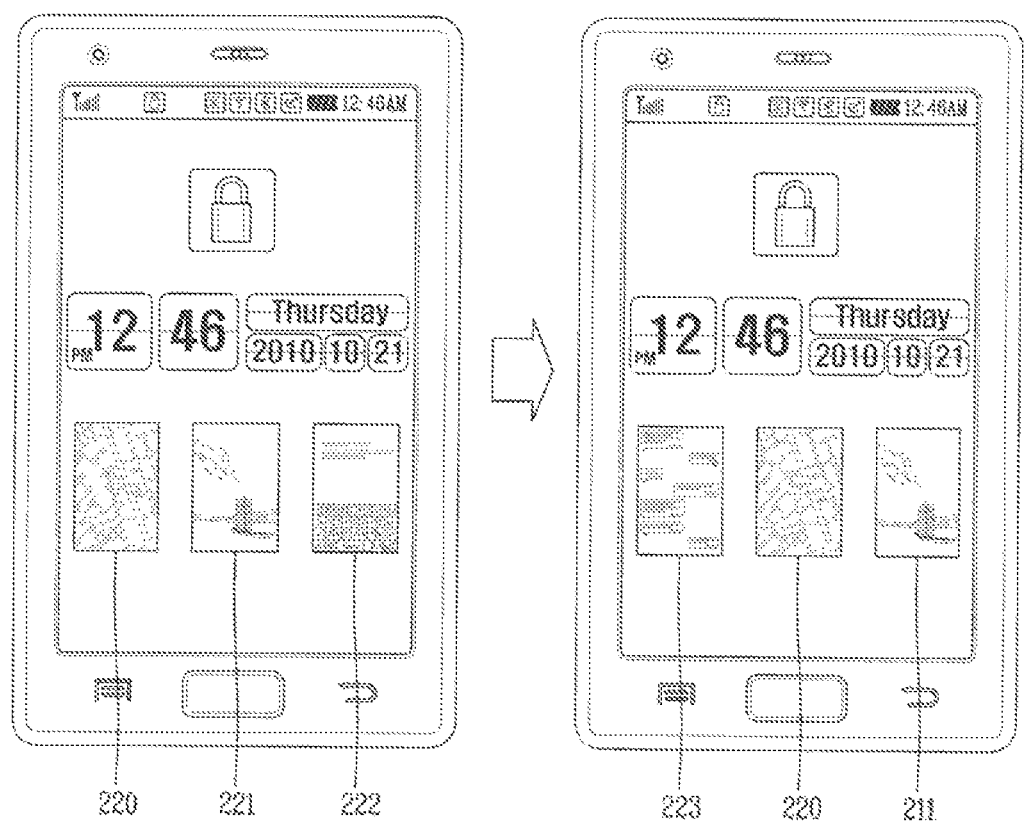

The controller 180 may preferentially display, as shown in FIGS. 5A and 5B, an execution screen of an application, from which a new event has been generated in the lock state, over the execution screens of other applications.

Herein, the newly generated event may include a text message received in the lock state, a message received via a messenger, a push message and the like.

As shown in FIG. 5A, while an execution screen 210 of a navigation application is displayed as the lock screen, for example, if a text message is received, the controller 180 may display an execution screen 211 relating to the text message, instead of the execution screen 210 of the navigation application. Alternatively, the controller 180 may display the execution screen 211 relating to the text message in an overlapping manner with the execution screen 210 of the navigation application.

Referring to FIG. 5B, the controller 180 may preferentially display the execution screen 223 of an application, from which the new event has been generated, over execution screens of a plurality of applications 220, 221 and 222 displayed on the lock screen.

Therefore, the mobile terminal in accordance with the one exemplary embodiment can provide the updated execution screen in response to running of the application as well as the execution screens of the applications on the lock screen, which is displayed in the lock state, accordingly, a user can be provided with information relating to the applications even when the mobile terminal is not in an unlock state.

The controller 180 of the mobile terminal may control the lock screen based upon a touch input, which is detected on the lock screen displaying the execution screens of applications, namely, a touch input detected on a touch screen, in the lock state of the mobile terminal.

Hereinafter, description will be given of a method for controlling the lock screen based upon a user's touch input through the touch screen in the lock state.

The method for controlling the lock screen displayed in the lock state of the mobile terminal according to the one exemplary embodiment is shown in FIGS. 6A, 6B, 7A, 7B, 8, 9A, 9B, 10A, 10B and 11.

Figure 6A:
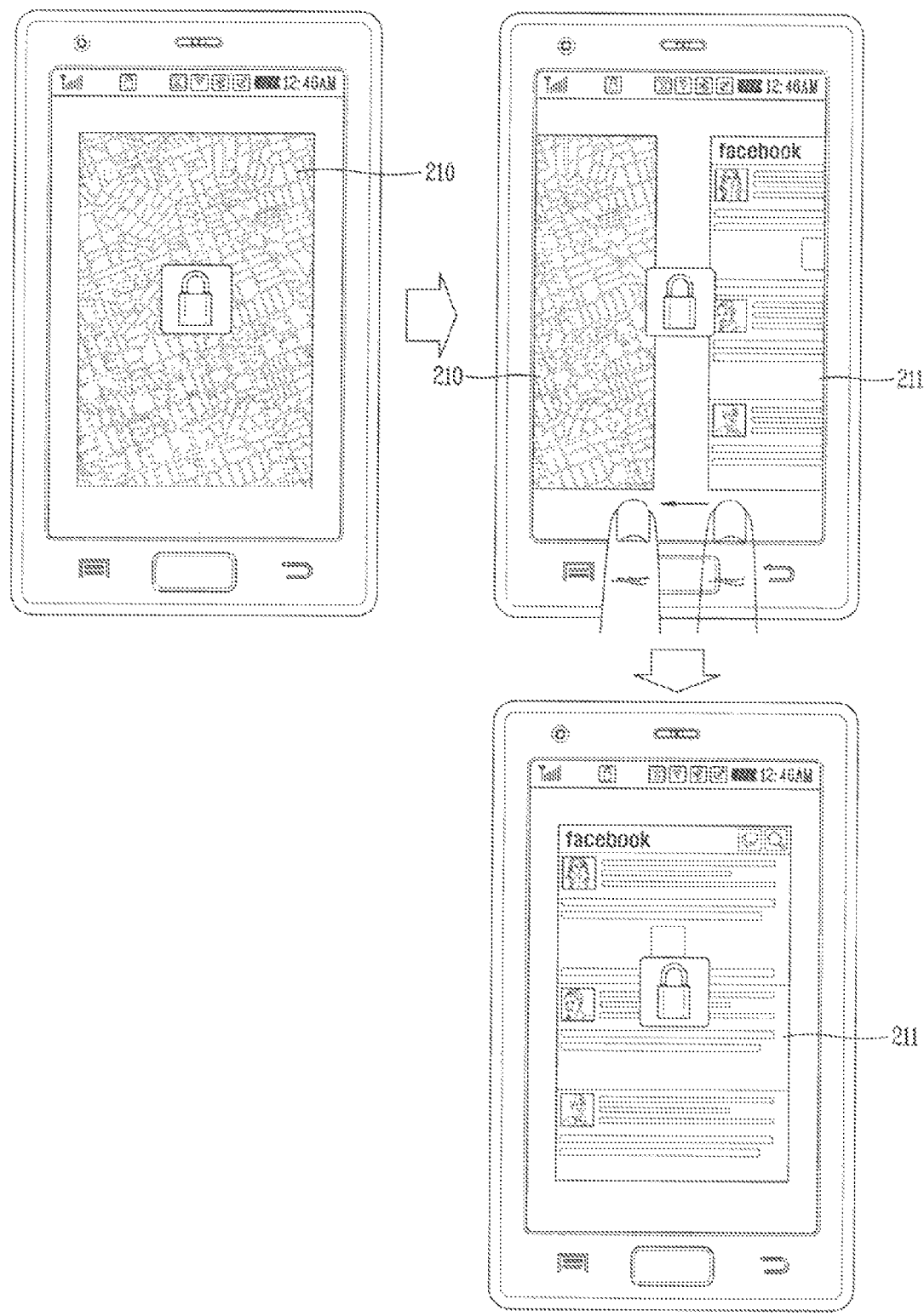
FIGS. 6A and 6B are overviews showing a method for shifting the lock screen displayed in the lock state of the mobile terminal.
Figure 6B:
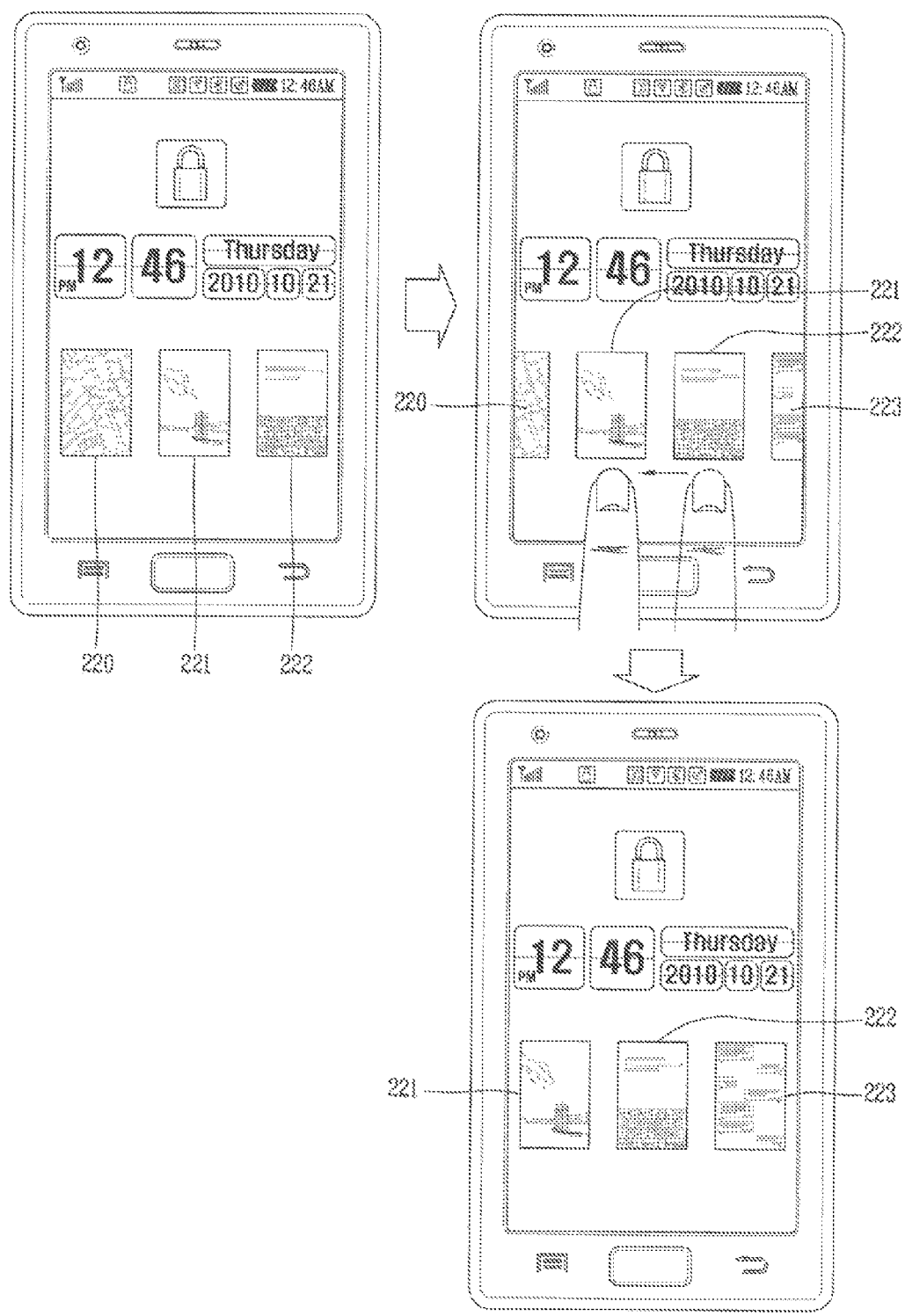

First, FIGS. 6A and 6B show a method for shifting (converting) the lock screen based upon a touch input, which is detected in the lock state of the mobile terminal.

Referring to FIG. 6A, when a user applies a touch input in a certain direction to the lock screen, on which an execution screen 210 of the first application is displayed, the controller 180 (see FIG. 1) may disappear the execution screen 210 of the first application and display an execution screen 211 of a second application based upon the touch input detected on the lock screen. (The touch input detected on the lock screen is a touch input detected on the touch screen 151)

Similarly, referring to FIG. 6B, when a user applies a touch input in a certain direction to the lock screen, on which execution screens 220, 221 and 222 of first to third applications are displayed, the controller 180 may disappear the execution screen 220 of the first application and display an execution screen 223 of a fourth application based upon the touch input detected on the lock screen.

In the meantime, the touch input applied to the lock screen in the certain direction may be set by a user or a default setting of the mobile terminal, and also the input may be carried out in various directions, such as horizontally, vertically, diagonally and the like.

In the lock state, the controller 180 may respond to a touch input with respect to every portion on the touch screen 151 (see FIGS. 1 and 2), or to a touch input with respect to a specific portion.

Hence, when the controller 180 is allowed to respond only to a touch input applied to the specific portion in the lock state, the controller 180 may convert (shift) the lock screen, as shown in FIGS. 6A and 6B, only when detecting a touch input applied to the specific portion.

Figure 7A:
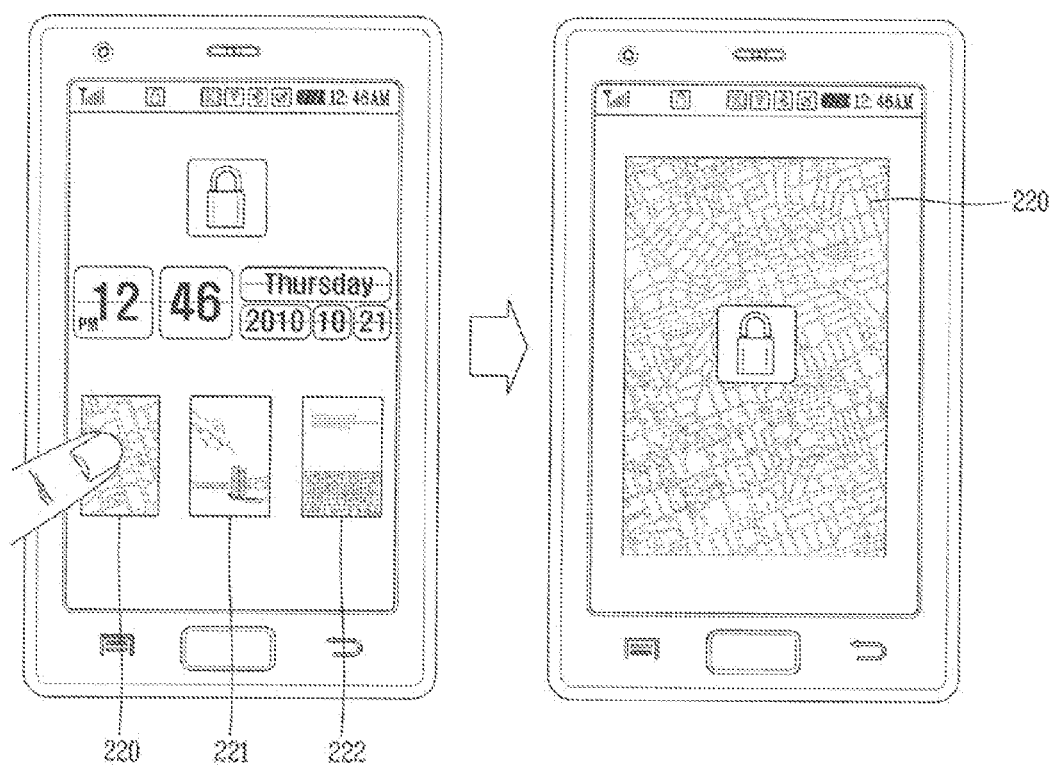
FIGS. 7A and 7B are overviews showing a method for shifting the lock screen displayed in the lock state of the mobile terminal.
Figure 7B:
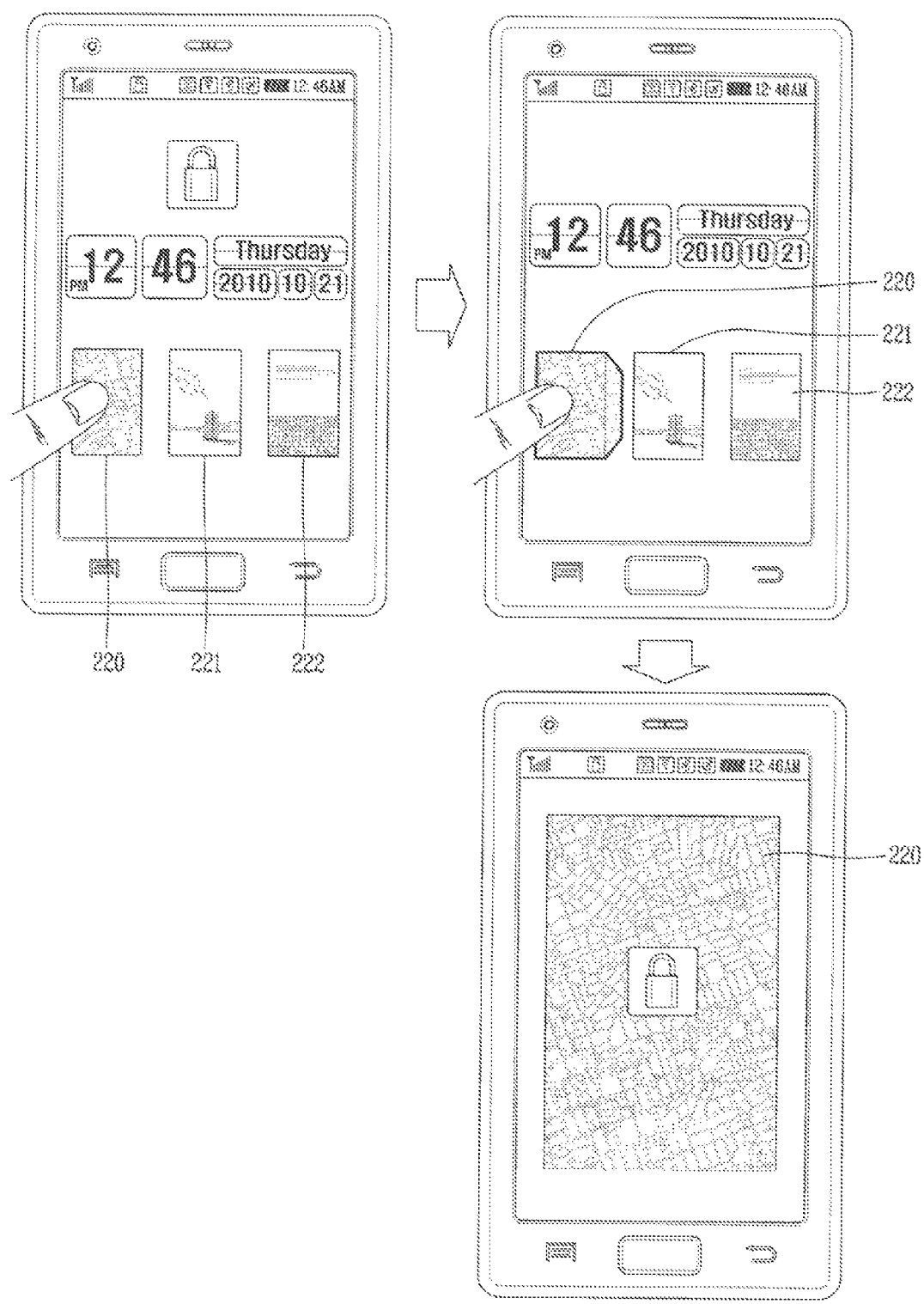

Next, FIGS. 7A and 7B shows a method for enlarging or highlighting execution screens of applications displayed on the lock screen based upon a touch input detected in the lock state of the mobile terminal.

First, referring to FIG. 7A, on the lock screen, on which execution screens 220, 221 and 222 of first to third applications are displayed, for example, upon detecting a touch input with respect to the execution screen 220 of the first application, the controller 180 may enlarge the execution screen 220 of the first application.

Referring to FIG. 7B, upon detecting a touch input with respect to the execution screen 220 of the first application, the controller 180 may highlight the execution screen 220 of the first application. Also, upon detecting a user's touch input with respect to the highlighted execution screen 220 of the first application, the controller 180 may enlarge the execution screen 220 of the first application.

FIGS. 8, 9A, 9B, 10A and 10B respectively show a method for executing an application corresponding to an execution screen displayed on the lock screen based upon a touch input detected in the lock state of the mobile terminal.

The controller 180 of the mobile terminal according to the one exemplary embodiment may execute an application corresponding to an execution screen displayed on the lock screen based upon a touch input detected in the lock state.

Figure 8:
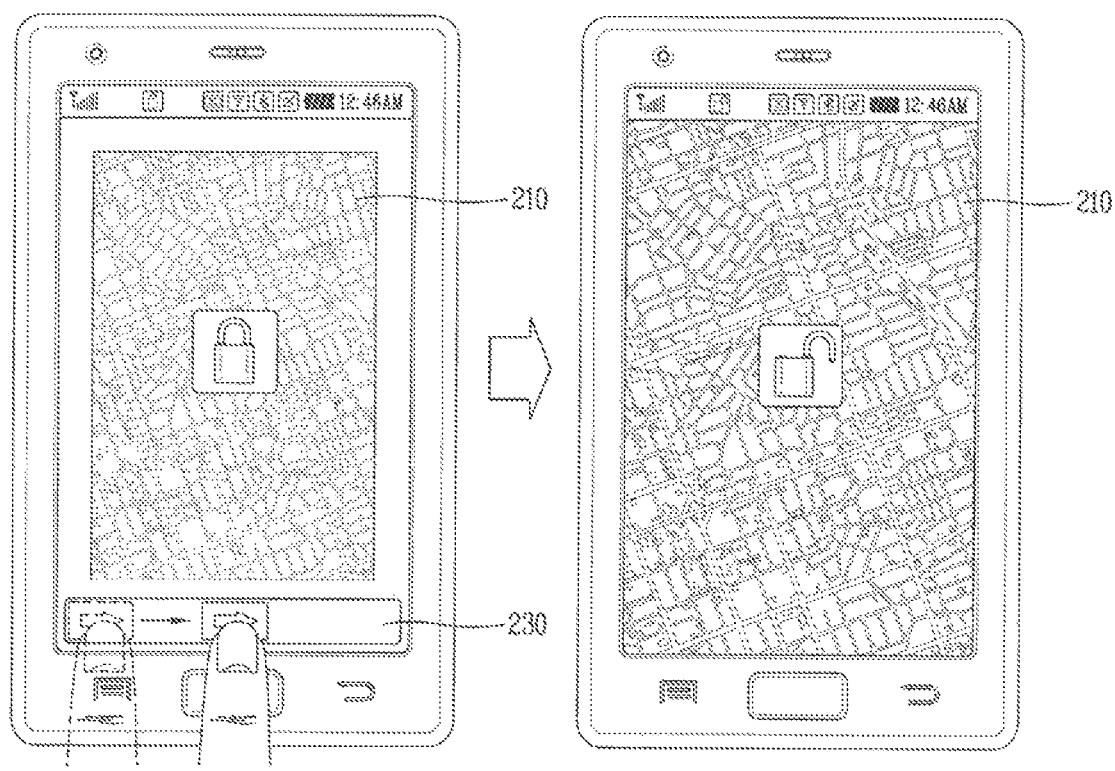
FIGS. 8, 9A, 9B, 10A and 10B are overviews showing a method for executing an application in the lock state of the mobile terminal.

Referring to FIG. 8, upon detecting a touch input on the lock screen, on which the execution screen 210 of the first application, namely, the touch screen 151 (see FIGS. 1 and 2), then the controller 180 may run the application corresponding to the execution screen 210 and convert (shift) the lock state into an unlock state.

The controller 180 may display an object 230 to be touched on the lock screen, and upon detecting a touch input with respect to the object 230, execute an application corresponding to the execution screen displayed on the lock screen.

Herein, the object 230 is a target to be touched to release the lock state. Hence, the lock state may be released only when a touch input applied to the object 230 on the touch screen 151 is detected.

Figure 9A:
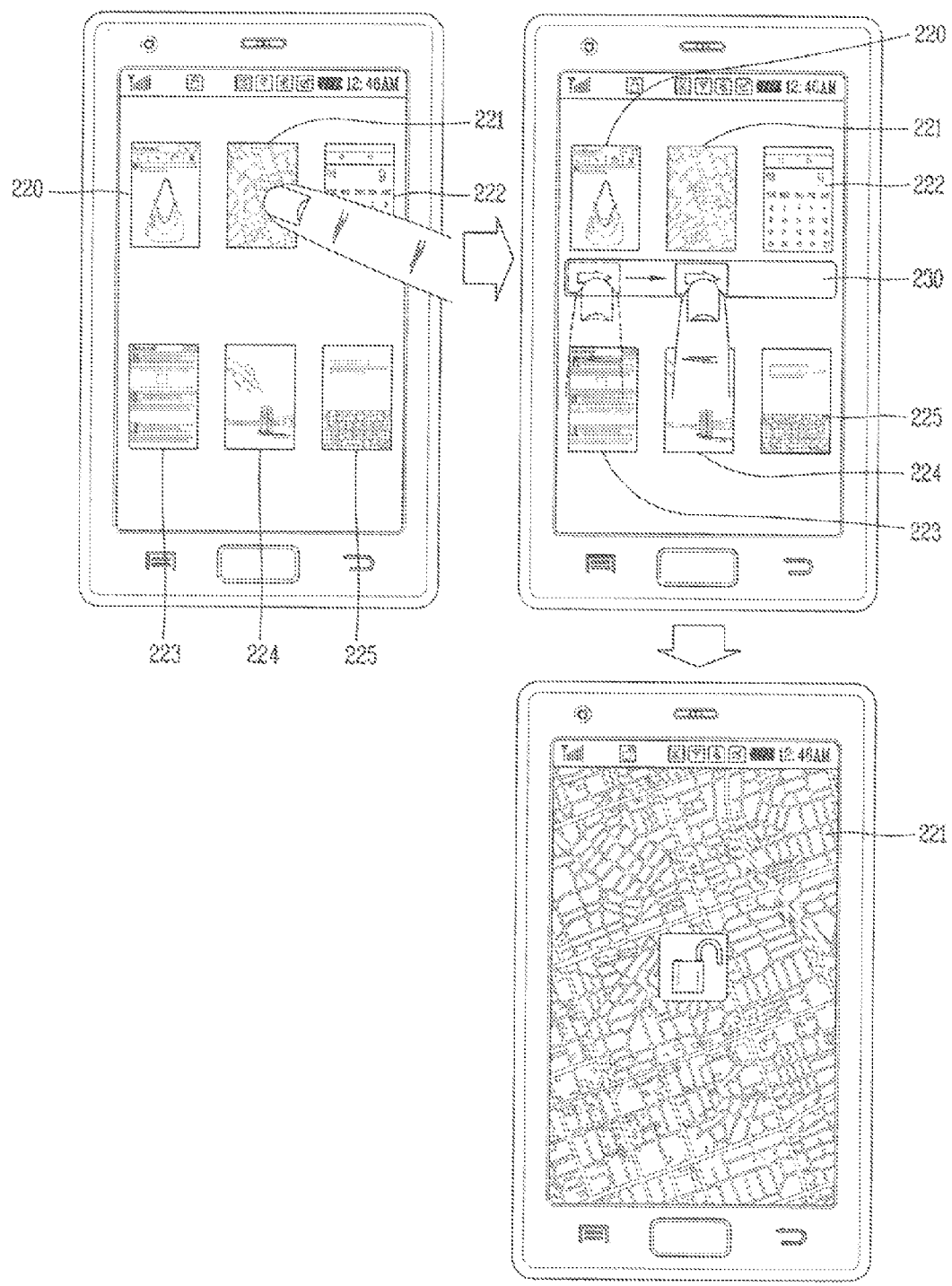
Figure 9B:
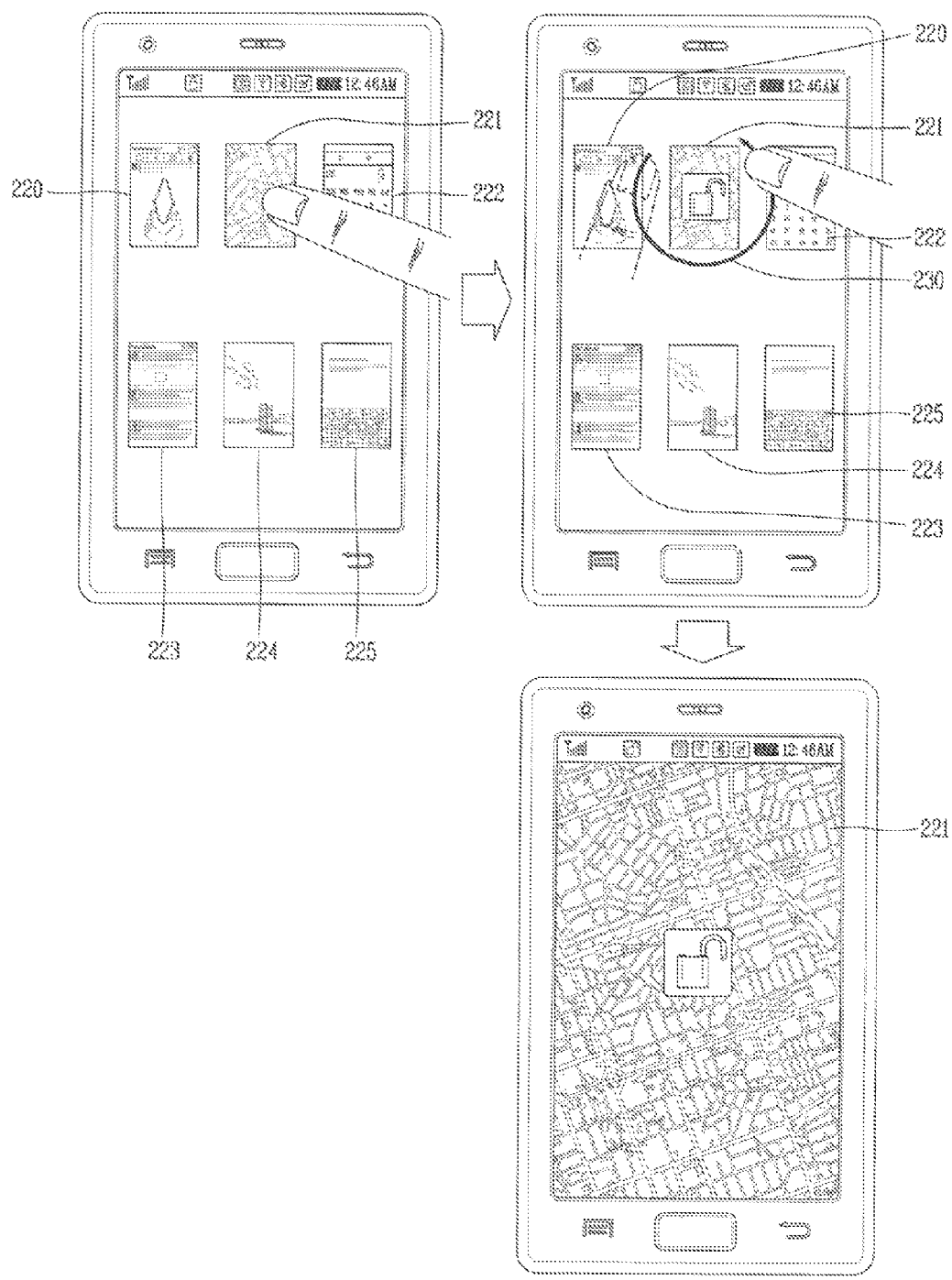

As shown in FIGS. 9A and 9B, upon detecting a first touch input applied to execution screens 220 to 225 of first to sixth applications displayed on the lock screen, the controller 180 may display an object 230 which is appeared for a second touch input. Also, upon detecting the second touch input applied to the object 230, the controller 180 may display the application corresponding to the execution screen, on which the first touch input has been detected, and shift the mobile terminal from the lock state into the unlock state.

FIG. 10 shows another exemplary embodiment of executing applications corresponding to execution screens displayed on the lock screen.

Figure 10A:
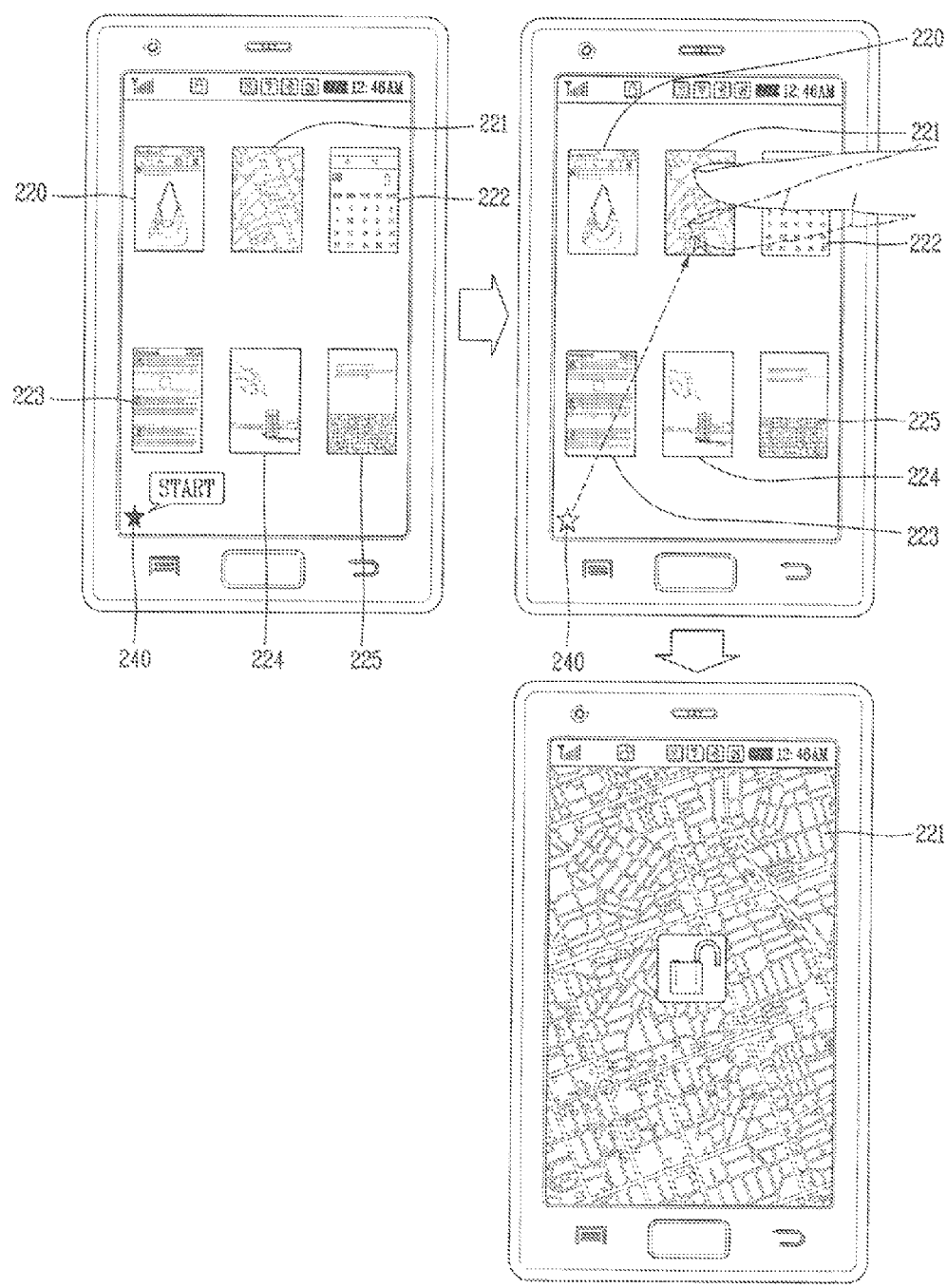

First, as shown in FIG. 10A, on the lock screen, on which execution screens 220 to 225 of first to sixth applications are displayed, the controller 180 (see FIG. 1) may execute an application corresponding to an execution screen located at a portion where a touch input starting from a first reference point 240 of the touch screen 151 (see FIGS. 1 and 2) is released.

Herein, the touch input may be made by sliding, dragging or flicking, starting from the first reference point.

Figure 10B:
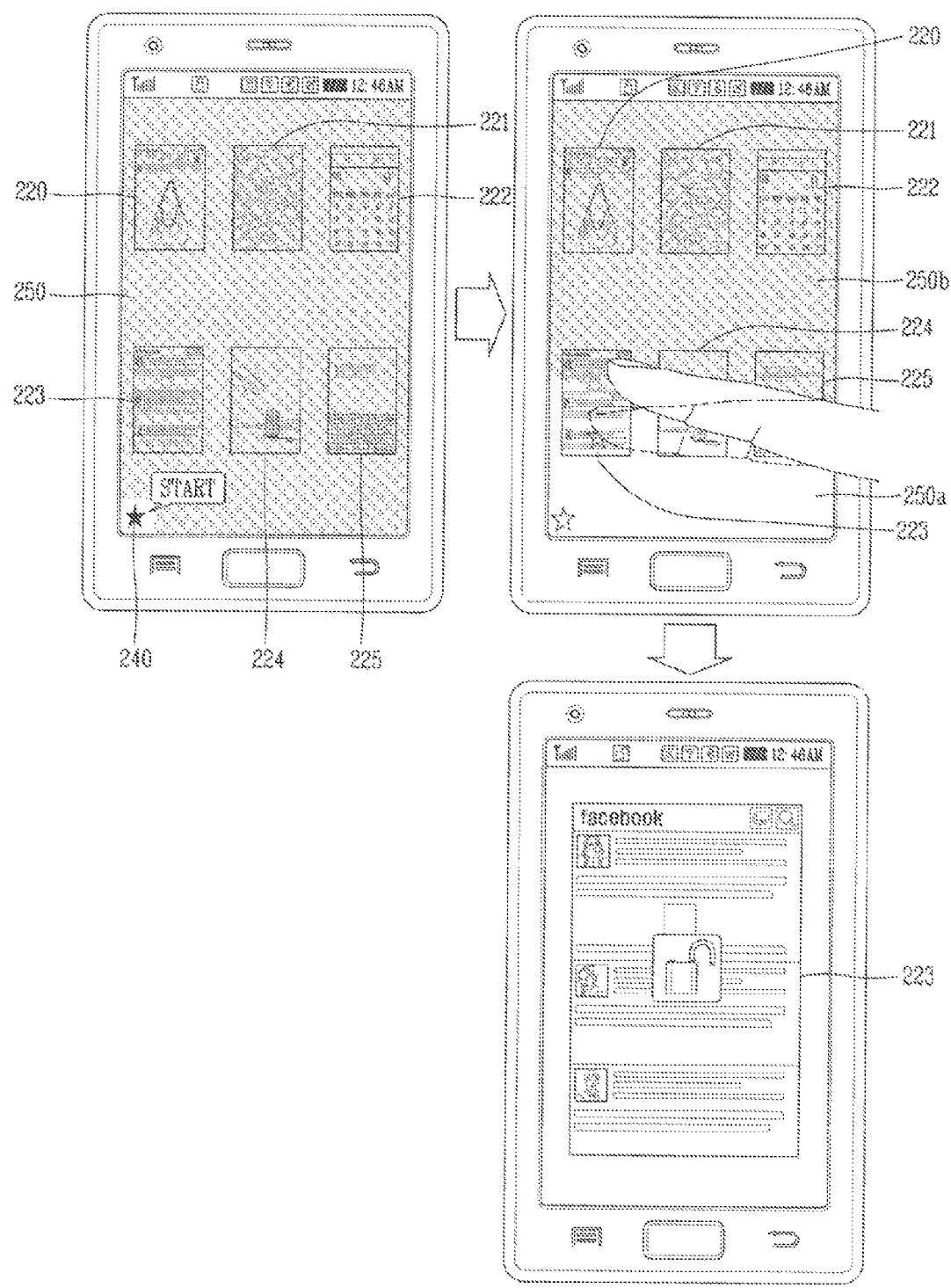

Meanwhile, referring to FIG. 10B, the controller 180 may allow the lock screen having the execution screens to overlap a cover image 250 in order to provide a user with visual information relating to the touch input.

Herein, the cover image 250 may be a transparent image overlapped by the execution screens. The controller 180 may make the cover image 250 invisible based upon a touch input starting from the first reference point 240. The cover image 250 may be displayed to render an area, from the first reference point 240 to a point where the user's touch input is detected, distinguished from other area. Hence, with this configuration, the touch screen may be divided into a first area 250a where a touch input is detected, and a second area 250b whether a touch input is not detected. Also, the controller 180 may execute an application corresponding to an execution screen located on a portion where the touch input is released, and shift the lock state into the unlock state.

Figure 11:
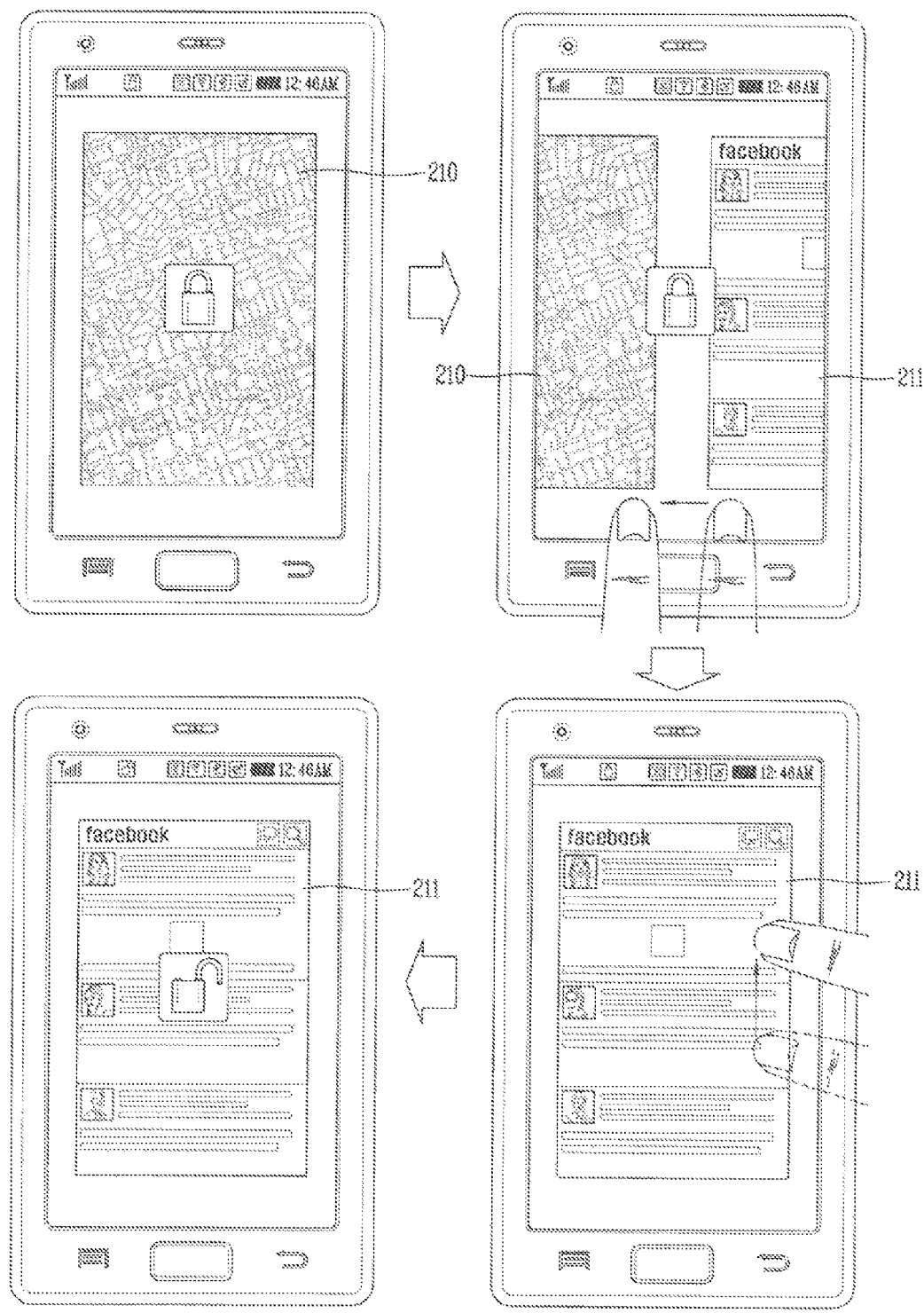
FIG. 11 is an overview showing a method for shifting the lock screen or executing an application in the mobile terminal.

FIG. 11 shows a method for shifting (converting) the lock screen or executing an application corresponding to an execution screen displayed on the lock screen, based upon a touch input detected in the lock state of the mobile terminal.

The controller 180 of the mobile terminal may shift the lock screen or execute an application corresponding to an execution screen displayed on the lock screen responsive to different touch inputs detected on the touch screen.

The touch input may include touch inputs applied in various manners, such as long touch, double touch, flicking, dragging, sliding and the like. Also, the controller 180 may control the mobile terminal to execute different operations according to preset control commands in response to the touch input and a touch direction.

For example, referring to FIG. 11A, upon detecting a first touch input in a first direction (for example, a horizontal direction), the controller 180 may switch the execution screen 210 of the first application displayed on the lock screen into the execution screen 211 of the second application.

Upon detecting a second touch input on the execution screen 211 in a direction (for example, a vertical direction) different from the first direction, the controller 180 may execute an application corresponding to the execution screen 211 displayed on the lock screen.

As such, the controller 180 of the mobile terminal according to the one exemplary embodiment may control or set the mobile terminal to execute different operations in the lock state based upon different touch inputs.

Figure 12:
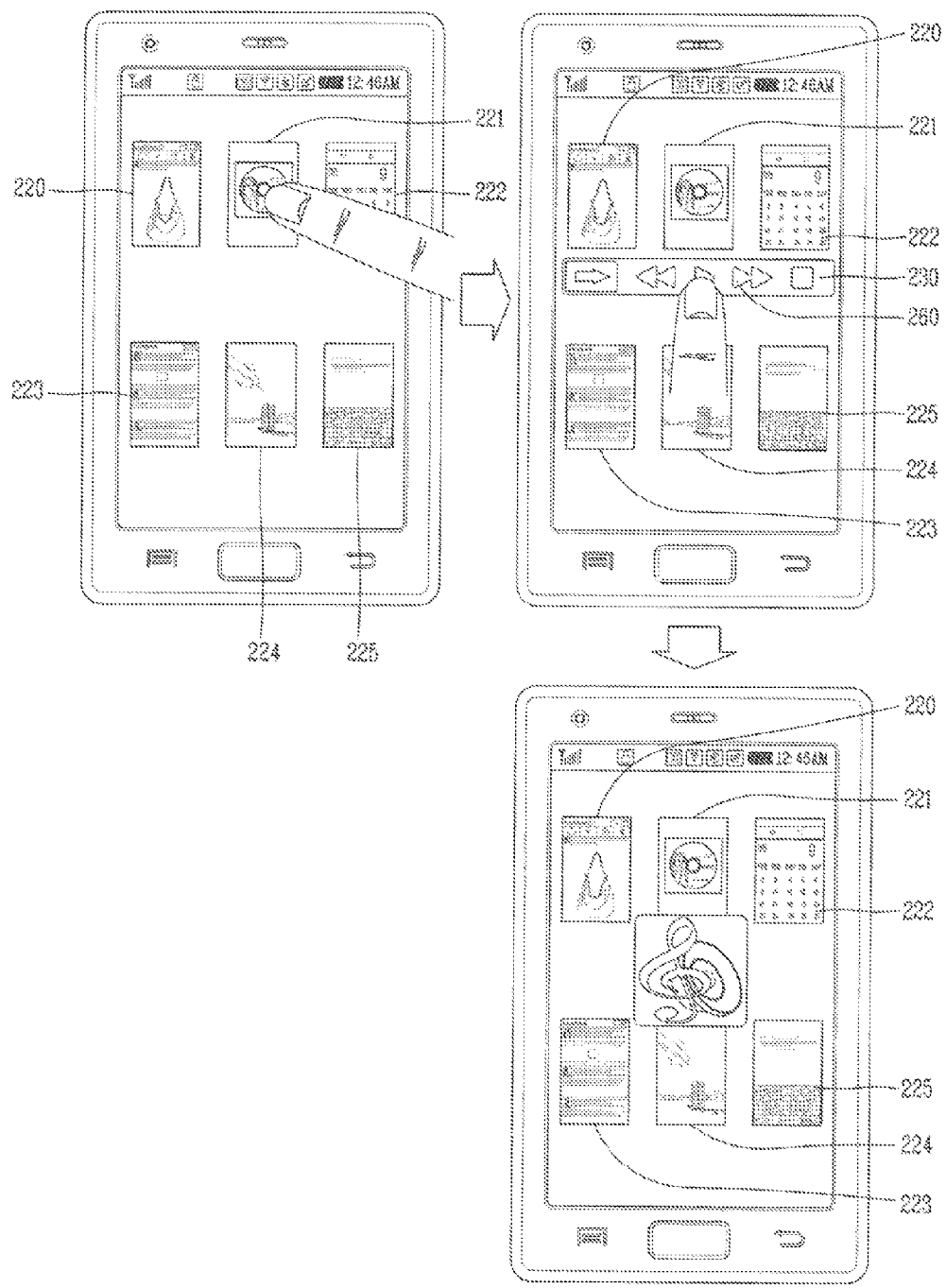
FIGS. 12 and 13 are overviews showing one exemplary embodiment of a method for controlling the lock screen of the mobile terminal.
Figure 13:
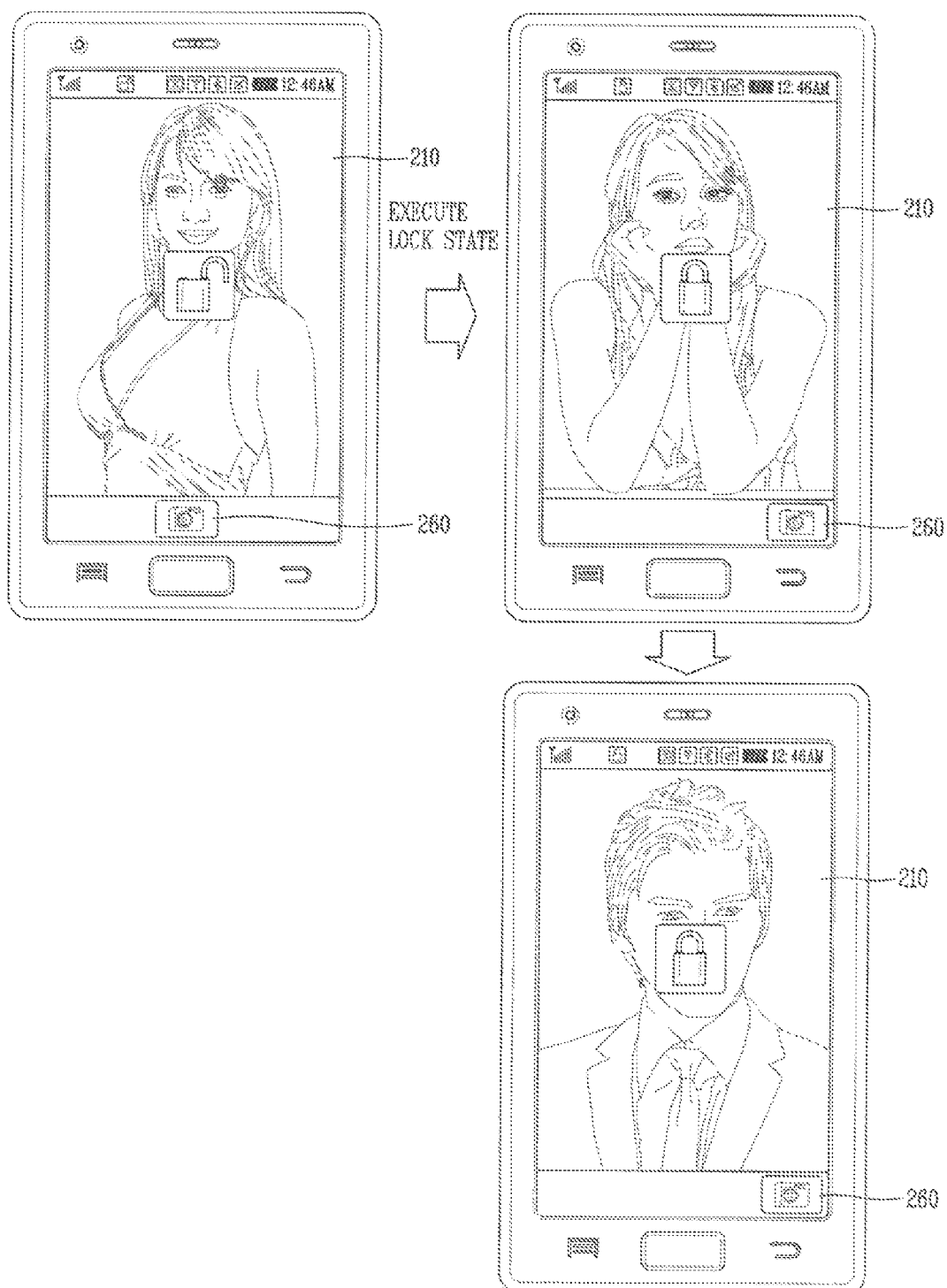

FIGS. 12 to 14 show exemplary embodiments of a method for controlling the mobile terminal on the lock screen of the mobile terminal.

First, the mobile terminal according to the one exemplary embodiment, as mentioned above, may be configured to control an application using the object 230, which is touched to execute the application corresponding to the execution screen 210 displayed on the lock screen. For example, referring to FIG. 12, upon detecting a touch input on the execution screen 221 of the second application on the lock screen, on which the execution screens 220 to 225 of the first to sixth applications are displayed, the controller 180 may display the object 230 on one area of the display unit or the lock screen. Here, the controller 180 may display the object 230 by including virtual keys (or visual keys) 260, which are used (touched) to control the second application (for example, a music playback application).

Therefore, the user can control the second application even on the lock screen using the visual keys 260 displayed on the object 230, and the controller 180 may control play music in the mobile terminal in response to the user's control command.

FIG. 13 shows a method for controlling the lock screen when an image capturing application was being run before the lock state is executed in the mobile terminal.

As shown in FIG. 13, when the lock state is executed while a user captures an image using the image capturing application, the controller 180 (see FIG. 1) may display an image signal input via a camera on the lock screen.

The controller 180 may display the visual keys 260, by which the image capturing can be controlled, on the lock screen, and receive a control command input by the user via the visual keys 260 so as to capture an image displayed on the lock screen. Also, the controller 180 may control the image captured in the lock state to be stored in a memory.

Figure 14A:
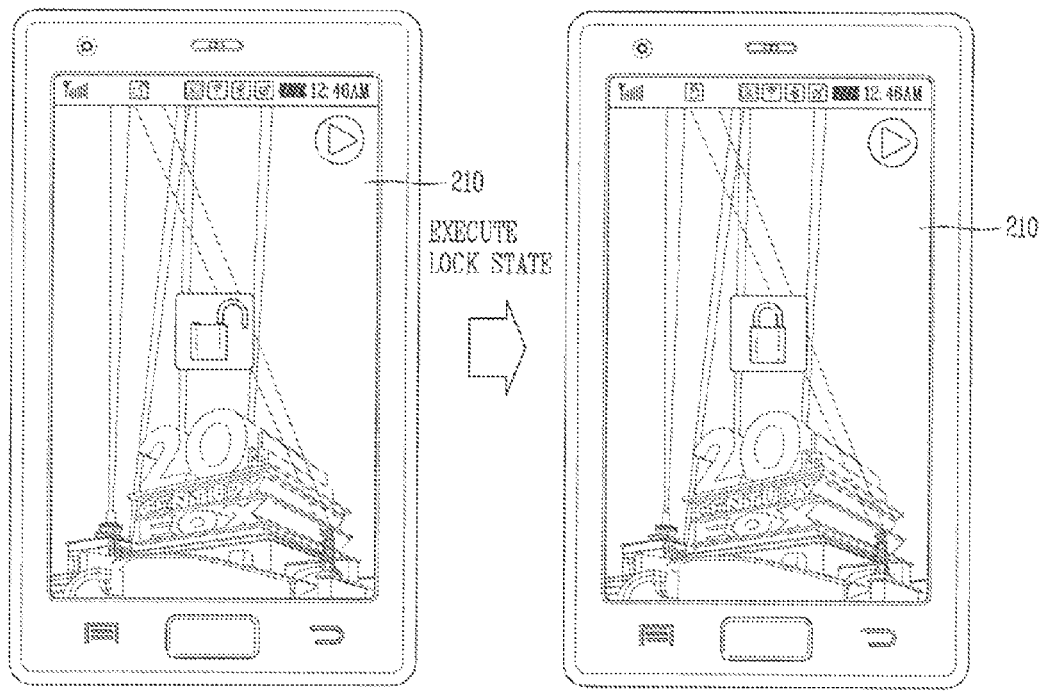
FIGS. 14A, 14B, 15A and 15B are overviews showing another exemplary embodiment of the method for controlling the lock screen of the mobile terminal.
Figure 14B:
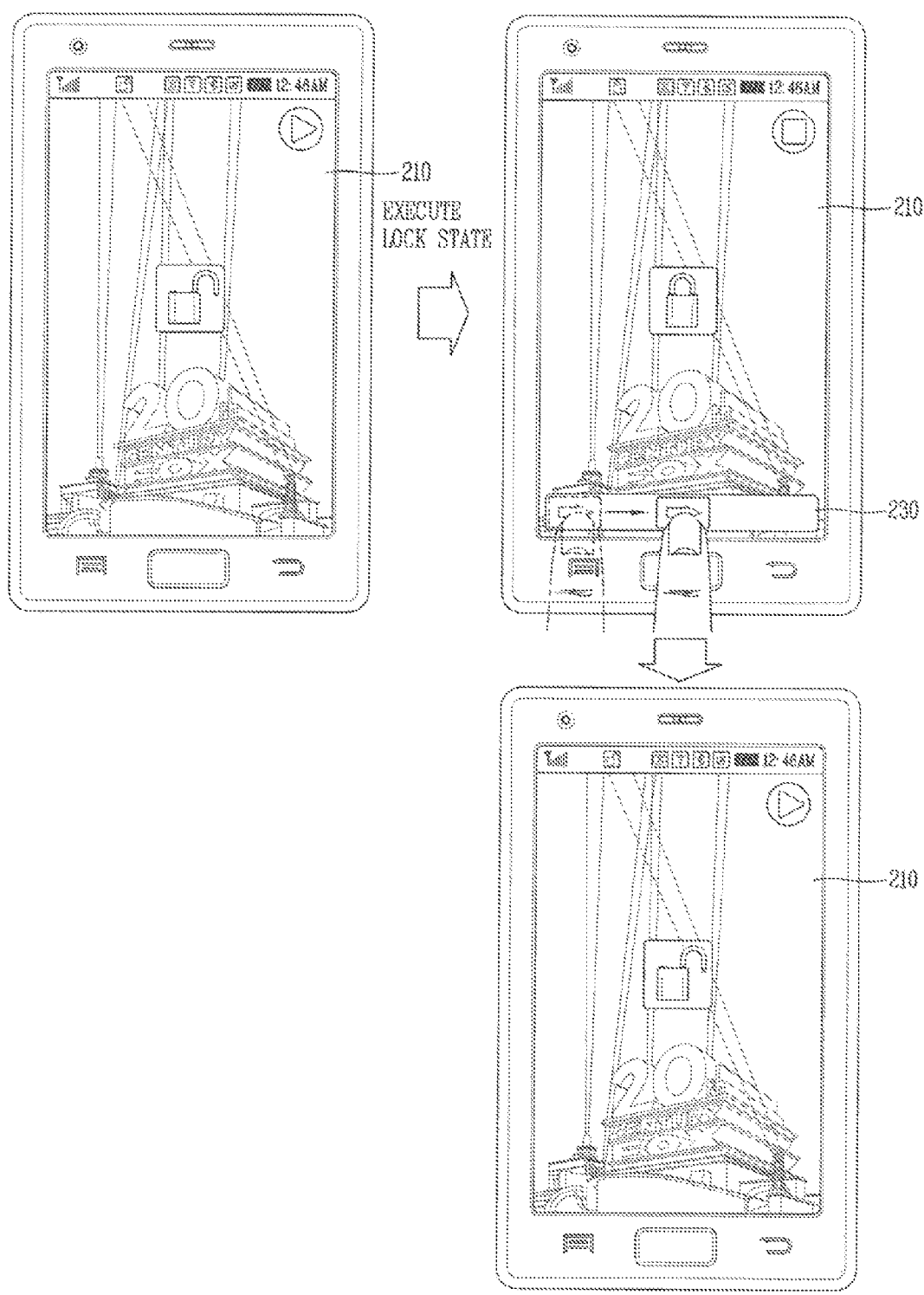

FIGS. 14A and 14B respectively show a method for controlling the lock screen when a video reproducing application was being run before the lock state is executed in the mobile terminal.

Referring to FIG. 14A, while a video reproducing application is run in the unlock state of the mobile terminal, when the lock state is executed due to satisfaction of a preset condition, then the controller 180 may control a video, which was being reproduced in the unlock state to be continuously reproduced even in the lock state.

Referring to FIG. 14B, when the lock state is executed while reproducing the video, the controller 180 may pause the reproduction and display the paused screen on the lock screen. Then, when the lock state is released by receiving a user's touch input via the object 230, the controller 180 may restart reproducing of the video based upon the paused screen on the lock screen.

Consequently, the mobile terminal can provide execution information relating to an application to the user in the lock state, and control those applications on the lock screen.

In the meantime, the touch screen 151 (see FIGS. 1 and 2) having the lock screen displayed thereon may be kept powered on (turned on). Alternatively, the touch screen 151 may be switched into a power-off state after a preset time elapses in order to reduce power consumption of a battery and unnecessary power consumption. Also, the power-off state may be converted into the power-on state again by the user (for example, by a user's key input).

In the mobile terminal according to the one exemplary embodiment, the time for which the lock screen is powered on may be set by the user on the lock screen.

Figure 15A:
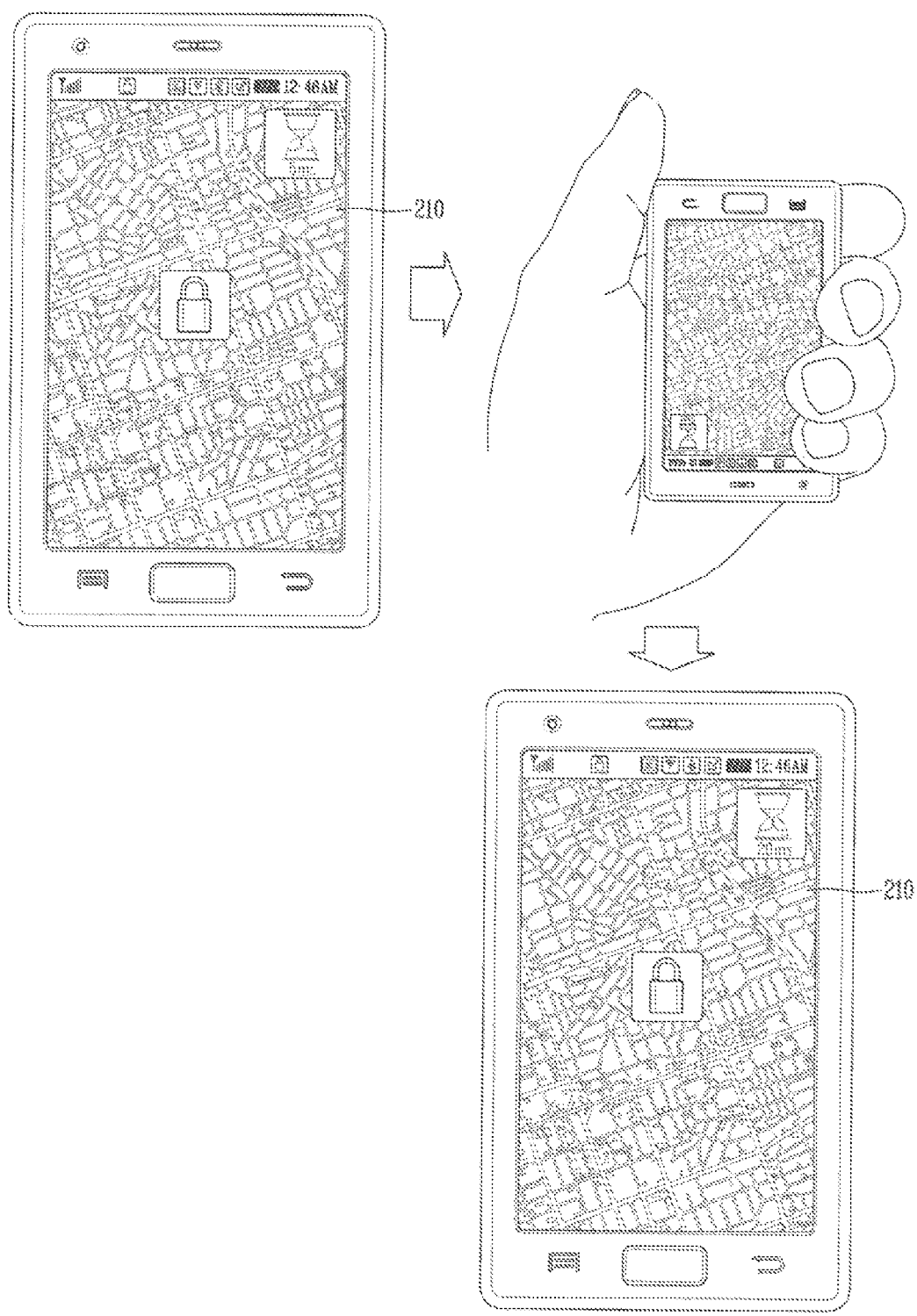
Figure 15B:
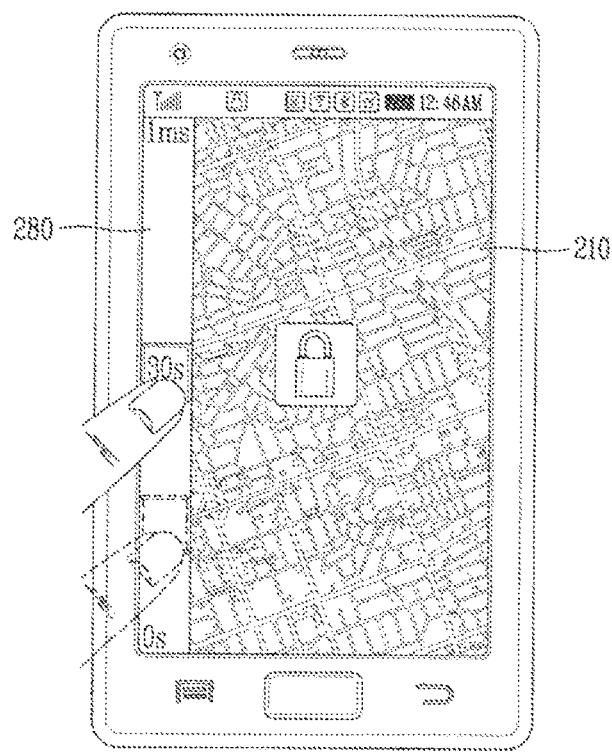

FIGS. 15A and 15B respectively show a method for setting a time for which the lock screen is powered on (kept displayed).

First, as shown in FIG. 15A, the controller 180 may display a time, for which the lock screen is powered on (kept displayed), using an icon, which has a shape changed as a time elapses. For example, a power-on time of the lock screen may be displayed using an hourglass icon, a clock icon, or a balloon icon. When the user desires to maintain the power-on state (displayed state) of the lock screen longer than the displayed power-on time, upon inclining the terminal main body within a preset angle, the sensing unit 140 may detect the inclination to transfer to the controller 180, and then the controller 180 may extend the power-on time based upon the inclination.

For example, in a state that the power-on time of the lock screen is 5 minutes left, when the terminal 100 (see FIG. 2) is inclined by about 180° and then turned back to its original state, the hourglass icon is filled with sand again and the power-on time of the lock screen extends 20 minutes more.

Also, referring to FIG. 15B, the controller 180 may indicate a time for which the lock screen is powered on in form of a bar 280. When the user moves (scrolls) the bar 280 by virtue of a touch input, the power-on time of the lock screen may extend.

As described above, the present disclosure allows controlling of the power-on time of the lock screen even in the lock state, accordingly, the lock screen which displays an execution screen required to the user can be kept visible.

Meanwhile, the mobile terminal may display a screen, which is captured in response to a capture command, on the lock screen when the lock screen is executed in a state that the capture command for an application has been generated before executing the lock state.

Herein, the capturing indicates converting a displayed screen into a format of an image, and the captured screen may be stored in the memory 160 (see FIG. 1).

Referring to FIG. 16, when the lock state is started after the user generates a command of capturing an execution screen 210 of an application, the controller 180 may display the captured screen on the lock screen.

The lock state may be executed by a preset key input (hold key), or as shown, executed by turning the terminal 100 (see FIG. 2) over or obscuring the camera 121 (see FIGS. 2A and 2B) with the terminal turned over.

As described above, in accordance with a mobile terminal and a control method thereof, an execution screen of an application can be displayed on a lock screen displayed in a lock state, thereby allowing application-related information to be provided even in the lock state.

Also, the mobile terminal may be allowed to activate an application displayed on a lock screen when a touch input for releasing the lock state is detected on an execution screen of the corresponding application, thereby facilitating a user to enter the application.

The configurations and methods of the mobile terminal may not be limitedly applied, but such embodiments may be configured by a selective combination of all or part of each embodiment so as to derive many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling a mobile terminal configured to operate in either a locked state or an unlocked state, the method comprising:
    displaying, on a display, a lock screen;
    displaying on the display, a first execution screen of a first application on a portion of the lock screen, wherein the first application is executing during the locked state; and
    displaying, on the display, a second execution screen of a second application on a portion of the lock screen in response to a first touch input, wherein the first touch input does not release the locked state, wherein the second application is executing during the locked state, wherein the displaying of the lock screen, and the displaying of the first execution screen, and the displaying of the second execution screen occur during the locked state.

2. The method of claim 1, wherein:
    the displayed second execution screen of the second application is different than the displayed first execution screen of the first application.

3. The method of claim 1, wherein the method further comprises: displaying an application screen of the second application in response to a second touch input; and releasing the locked state in response to the second touch input.

4. The method of claim 3, wherein the first touch input and the second touch input comprise touch inputs made by dragging, sliding or flicking.

5. The method of claim 1, further comprising updating the first execution screen of the first application during the locked state.

6. The method of claim 1, further comprising:
    releasing the locked state based on a second touch input being received within only a specific portion of the display.

7. The method of claim 1, wherein: the first execution screen and the second execution screen overlap a background image of the locked screen.

8. The method of claim 1, further comprising highlighting the first execution screen when the first touch input is received at a displayed location of the first execution screen.

9. The method of claim 1, further comprising: displaying an object as a target of a second touch input when the first touch input is detected; and releasing the locked state when the second touch input is detected on the displayed object.

10. The method of claim 1, wherein: one application of the first application or the second application is an image capturing application; and the displayed execution screen of the one application comprises an image received via a camera.

11. The method of claim 10, wherein the lock screen comprises a virtual key to permit capturing of an image via the camera.

12. The method of claim 1, further comprising: displaying an object on the lock screen; and transitioning from the locked state to the unlocked state in response to a second input received with regard to the displayed object.

13. The method of claim 1, further comprising: displaying the second execution screen in response to the first touch input received within only a specific portion of the lock screen, wherein the specific portion is less than an entire portion of the lock screen.

14. The method of claim 1, further comprising: detecting a second touch input for selecting the second execution screen of the second application; displaying an application corresponding to the selected execution screen based on the detected second touch input; and enlarging the selected execution.

15. The method of claim 1, wherein the lock screen comprises a first portion and a second portion, the method further comprising: displaying the second execution screen of the second application on the first portion of the lock screen: and displaying an icon on the second portion of the lock screen, wherein input received with regard to the icon causes the mobile terminal to transition to the unlocked state.

16. The method of claim 1, further comprising: displaying an image as the lock screen; and displaying the first execution screen and the second execution screen on the lock screen at a location that visually blocks a portion of the image.

17. The method of claim 1, further comprising: changing displayed locations of the first execution screen and the second execution screen in response to the first touch input, wherein during a time period, only a portion of the first execution screen and only a portion of the second execution screen are simultaneously displayed.

18. The method of claim 1, wherein prior to receiving the first touch input, the first execution screen is displayed and the second execution screen is not displayed, and wherein after the first touch input is no longer received, the second execution screen is displayed and the first execution screen is not displayed.

19. The method of claim 1, further comprising: changing displayed locations of the first execution screen and the second execution screen in a horizontal manner in response to the first touch input.

20. A mobile terminal configured to operate in either a locked state or an unlocked state, the mobile terminal comprising:
    a display, and a controller configured to: cause the display to display a lock screen; cause the display to display a first execution screen of a first application on a portion of the look screen, wherein the first application is executing during the locked state; and cause the display to display a second execution screen of a second application on a portion of the lock screen in response to a first touch input, wherein the first touch input does not release the locked state, wherein the second application is executing during the locked state, wherein the displaying of the lock screen, and the displaying of the first execution screen, and the displaying of the second execution screen during the locked state.

21. The mobile terminal of claim 20, wherein: the displayed second execution screen of the second application is different than the displayed first execution screen of the first application.

22. The mobile terminal of claim 20, wherein the controller is further configured to: cause the display to display an application screen of the second application in response to a second touch input; and release the locked state in response to the second touch input.

23. The mobile terminal of claim 22, wherein the first touch input and the second touch input comprise touch inputs made by dragging, sliding or flicking.

24. The mobile terminal of claim 20, wherein the controller is further configured to: cause the display to update the first execution screen of the first application during the locked state.

25. The mobile terminal of claim 20, wherein the controller is further configured to: release the locked state based on a second touch input being received within only a specific portion of the display.

26. The mobile terminal of claim 20, wherein: the first execution screen and the second execution screen overlap a background image of the locked screen.

27. The mobile terminal of claim 20, wherein the controller is further configured to: cause the display to highlight the first execution screen when the first touch input is received at a displayed location of the first execution screen.

28. The mobile terminal of claim 20, wherein the controller is further configured to: cause the display to display an object as a target of a second touch input when the first touch input is detected; and release the locked state when the second touch input is detected on the displayed object.

29. The mobile terminal of claim 20, wherein: one application of the first application or the second application is an image capturing application; and the displayed execution screen of the one application comprises an image received via a camera.

30. The mobile terminal of claim 29, wherein the lock screen comprises an virtual key to permit capturing of an image via the camera.

31. The mobile terminal of claim 20, wherein the controller is further configured to:
cause the display to display an object on the lock screen; and cause the mobile terminal to transition from the locked state to the unlocked state in response to a second input received with regard to the displayed object.

32. The mobile terminal of claim 20, wherein the controller is further configured to:
cause the display to display the second execution screen in response to the first touch input received within only a specific portion of the lock screen wherein the specific portion is less than an entire portion of the lock screen.

33. The mobile terminal of claim 20, wherein the controller is further configured to: detect a second touch input for selecting the second execution screen of the second application; cause the display to display an application corresponding to the selected execution screen based on the detected second touch input; and cause the display to enlarge the selected execution.

34. The mobile terminal of claim 20, wherein the lock screen comprises a first portion and a second portion, wherein the controller is further configured to: cause the display to display the second execution screen of the second application on the first portion of the lock screen: and cause the display to display an icon on the second portion of the lock screen, wherein input received with regard to the icon causes the mobile terminal to transition to the unlocked state.

35. The mobile terminal of claim 20, wherein the controller is further configured to:
cause the display to display an image as the lock screen; and cause the display to display the first execution screen and the second execution screen on the lock screen at a location that visually blocks a portion of the image.

36. The mobile terminal of claim 20, wherein the controller is further configured to: cause the display to change displayed locations of the first execution screen and the second execution screen in response to the first touch input, wherein during a time period, only a portion of the first execution screen and only a portion of the second execution screen are simultaneously displayed.

37. The mobile terminal of claim 20, wherein prior to receiving the first touch input, the first execution screen is displayed and the second execution screen is not displayed, and wherein after the first touch input is no longer received, the second execution screen is displayed and the first execution screen is not displayed.

38. The mobile terminal of claim 20, wherein the controller is further configured to: cause the display to change displayed locations of the first execution screen and the second execution screen in a horizontal manner in response to the first touch input.

* * * * *